(12) United States Patent
Murai et al.

(10) Patent No.: US 6,539,000 B1
(45) Date of Patent: Mar. 25, 2003

(54) MULTICAST COMMUNICATION METHOD AND APPARATUS

(75) Inventors: Shinya Murai, Takatsuki (JP); Fumiko Tanaka, Kobe (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/357,281

(22) Filed: Jul. 20, 1999

(30) Foreign Application Priority Data

Jul. 21, 1998 (JP) .......................................... 10-205072
Jul. 31, 1998 (JP) .......................................... 10-217521

(51) Int. Cl.[7] .............................................. H04L 12/56
(52) U.S. Cl. ........................ 370/260; 370/390; 370/432
(58) Field of Search ................................. 370/260, 352, 370/392, 394, 395.1, 431, 432, 461, 462, 473, 312, 349, 390, 389

(56) References Cited

U.S. PATENT DOCUMENTS

| | | | | |
|---|---|---|---|---|
| 5,432,798 A | * | 7/1995 | Blair | 714/748 |
| 5,831,973 A | * | 11/1998 | Yokotani et al. | 370/236 |
| 5,905,871 A | * | 5/1999 | Buskens et al. | 709/238 |
| 5,983,005 A | * | 11/1999 | Monteiro et al. | 709/231 |
| 6,112,251 A | * | 8/2000 | Rijhsinghani | 370/389 |
| 6,195,355 B1 | * | 2/2001 | Demizu | 370/395.71 |

FOREIGN PATENT DOCUMENTS

JP   6-337829   12/1994

* cited by examiner

Primary Examiner—Douglas Olms
Assistant Examiner—Brian Nguyen
(74) Attorney, Agent, or Firm—Oblon, Spivak, McClelland, Maier & Neustadt, P.C

(57) ABSTRACT

On the basis of a state of multicast packets which are transmitted among a plurality of terminals connected via a network, a terminal, which determines a receive order for maintaining an identical order of multicast packets to be received by the plurality of terminals, is selected. Upon transmitting a multicast packet from one of the plurality of terminals, the receive order informed from the selected terminal is appended to that multicast packet.

10 Claims, 26 Drawing Sheets

PSEUDO PACKET

ORDER NUMBER MANAGEMENT TABLE

| ORDER NUMBER | SOURCE IDENTIFIER | STATUS |
|---|---|---|
| 1 | B | DATA TRANSMITTED |
| 2 | A | DATA TRANSMITTED |
| 3 | C | DATA TRANSMITTED |
| 4 | A | NUMBER ISSUED |
| 5 | B | DATA TRANSMITTED |

| DESTINATION | SOURCE | TERMINAL ORDER NUMBER | ORDER NUMBER | PAYLOAD (NULL) |

RECEIVE SKIP INFORMING PACKET

MULTICAST COMMUNICATION METHOD AND APPARATUS

BACKGROUND OF THE INVENTION

The present invention relates to a multicast communication method including control of the receive order of multicast packets in, e.g., a computerized conference system, and a multicast communication apparatus using the method.

In a computerized conference system and so on which share the window of a plurality of terminals, e.g., personal computers, an application which matches the operation result of each terminal in all the terminals which share the window is used. In this case, when a given terminal in a group which shares the window receives a multicast packet transmitted from another terminal in that group, all the terminals in the group are required to maintain an identical receive order of multicast packets, and pass packets to the application.

As a communication system which meets such requirement, the following system is known. That is, in this system, a given terminal in a multicast communication group has an order control section for controlling the receive order of multicast packets to maintain an identical receive order of multicast packets. As the order control method of multicast packets, the following methods are available.

1) A terminal having a multicast packet inquires the receive order in the group of the order control section. The order control section transmits the receive order of multicast packets to the terminal having a multicast packet in response to the inquiry. The terminal having a multicast packet transmits the receive order received from the order control section together with the multicast packet. Upon receiving the multicast packet and receive order, the respective terminals rearrange multicast packets in accordance with the received receive order, and pass them to the application.

2) A terminal having a multicast packet transmits the packet to be multicasted to a terminal having the order control section. Upon receiving the packet to be multicasted, the order control section multicasts that packet to other terminals in the group together with the receive order. When the terminal including a multicast packet has the order control section, it transmits the receive order together with the multicast packet.

3) A terminal which has a multicast packet transmits the multicast packet to all terminals including a terminal having an order control section. The order control section assigns the receive order of packet to the received multicast packet, and informs other terminals of that receive order. Upon receiving the multicast packet, the respective terminals rearrange multicast packets in accordance with the informed receive order. When the terminal including a multicast packet has the order control section, it sends the receive order together with the multicast packet.

In any of methods 1 to 3, when the terminal which performs order control of multicast packets matches a terminal for multicasting a packet, no communication is required via a network to determine the receive order of multicast packets. However, when the terminal which performs the order control differs from the terminal having a multicast packet, control data for controlling the receive order of multicast packets must be exchanged between the terminal with the order control section and other terminals via the network.

For this reason, when many multicast packets are transmitted from terminals other than the terminal which performs the order control, many data must be exchanged via the network to achieve the order control. If the transfer rate of the communication network is not high enough, much time is required to transmit multicast packets.

On such communication system, which terminal transmits a greater number of multicast packets largely depends on the application which uses the communication system and the purposes intended by the user who uses the application. Hence, it is difficult to specify a terminal which transmits a greater number of multicast packets in advance.

As described above, conventionally, when many multicast packets are transmitted from terminals other than the terminal for performing the order control, many data must be exchanged via the network to achieve the order control. If the transfer rate of the communication network is not high enough, much time is required to transmit multicast packets.

Also, the number of multicast packets transmitted from each terminal on the communication system largely depends on the application which uses the communication system and the purposes intended by the user who uses the application. Hence, it is difficult to specify a terminal which transmits a greater number of multicast packets in advance.

BRIEF SUMMARY OF THE INVENTION

It is an object of the present invention to provide a multicast communication method which can achieve high-speed multicast communications while maintaining an identical receive order of multicast packets in a plurality of terminals upon exchanging multicast packets among the plurality of terminals.

It is another object of the present invention to provide a multicast communication method and apparatus, which can efficiently make multicast communications while reducing the amount of transmit/receive data required for maintaining the receive order of multicast data.

The present invention provides selecting from among a plurality of terminals connected by a network a terminal for determining a receive order for maintaining an identical order of multicast packets to be received by the plurality of terminals, in accordance with a state of multicast packets which are transmitted by at least some of the terminals; and transmitting a multicast packet after the receive order informed from the selected terminal is appended to the multicast packet, upon transmitting the multicast packet from one of the plurality of terminals.

The present invention provides a communication apparatus comprising a determination section which determines a receive order for maintaining an identical order of multicast packets to be received by at least some of the plurality of terminals, in accordance with a request from at least one of the terminals which transmits a multicast packet, when multicast packets are exchanged among at least some of the plurality of terminals connected to a network, and a start-up section for starting up the determination section when a terminal is selected from among the plurality of terminals on the basis of a state of multicast packets which are transmitted among at least some of the plurality of terminals.

The present invention provides a communication apparatus comprising a detection section which detects a state of multicast packets which are transmitted by at least some of a plurality of terminals connected by a network, when multicast packets are exchanged among the plurality of terminals, and a selection section which selects from among the plurality of terminals a terminal for determining a receive order for maintaining an identical order of multicast packets to be received by the plurality of terminals in accordance with a detection result of the detection section.

Furthermore, the present invention provides a multicast communication method of performing a multicast communication using packets among a plurality of terminals connected by a network, comprising the steps of issuing a receive order request to a terminal which determines a receive order number for maintaining an identical order of multicast data to be received by at least some of the plurality of terminals, upon transmitting multicast data, determining based on a size of the multicast data whether or not a packet to be transmitted is to contain the multicast data, multicasting, to the plurality of terminals, a packet formed by appending to the multicast data a receive order number informed in response to a request, when issuance of the receive order number is requested using a packet which does not contain multicast data, and writing a receive order number issued for the multicast data in the packet when the terminal for determining the receive order number receives the packet which requests to issue the receive order number, and the received packet contains the multicast data, and multicasting the packet to the plurality of terminals.

Furthermore, the present invention provides a communication apparatus comprising a request section which requests a terminal for determining a receive order number for maintaining an identical order of multicast data to be received by at least some of a plurality of terminals to issue the receive order number, when multicast data are exchanged using packets among the plurality of terminals connected by a network, a discrimination section which discriminates based on a size of the multicast data whether or not the multicast data is attended to a packet output when the receive order number is requested by the request section, and a multicast section which multicasts a packet formed by appending the receive order number informed in response to the request to the multicast data, to the plurality of terminals when the request section requests to issue the receive order number using a packet which does not contain multicast data.

Furthermore, the present invention provides a communication apparatus for exchanging multicast data using packets among a plurality of terminals connected by a network, comprising an issue section which issues a receive order number upon receiving a packet, which is transmitted from one of the plurality of terminals that requests to issue the receive order number for maintaining an identical order of multicast data to be received by the plurality of terminals, a multicast section which writes the receive order number issued by the issue section in the packet and multicasts the packet to the plurality of terminals, when the received packet contains multicast data, and an informing section which informs a terminal, which requests the receive order number, of the receive order number issued by the issue section, when the received packet does not contain multicast data.

According to the present invention, since the issue procedure of the receive order number can be switched in correspondence with the multicast data size, multicast communications can be efficiently made while reducing the amount of transmit/receive data required for maintaining the receive order of multicast data.

According to the present invention, upon receiving multicast data, the receive order number of specific multicast data informed in advance is ignored, and other multicast data are received in the order of receive order numbers. Hence, even when a failure has been detected in one of terminals which form a multicast group, the receive order of multicast packets can be smoothly corrected among terminals other than the terminal which has failed, thus flexibly coping with dynamic changes in environment of the network without interrupting communications.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
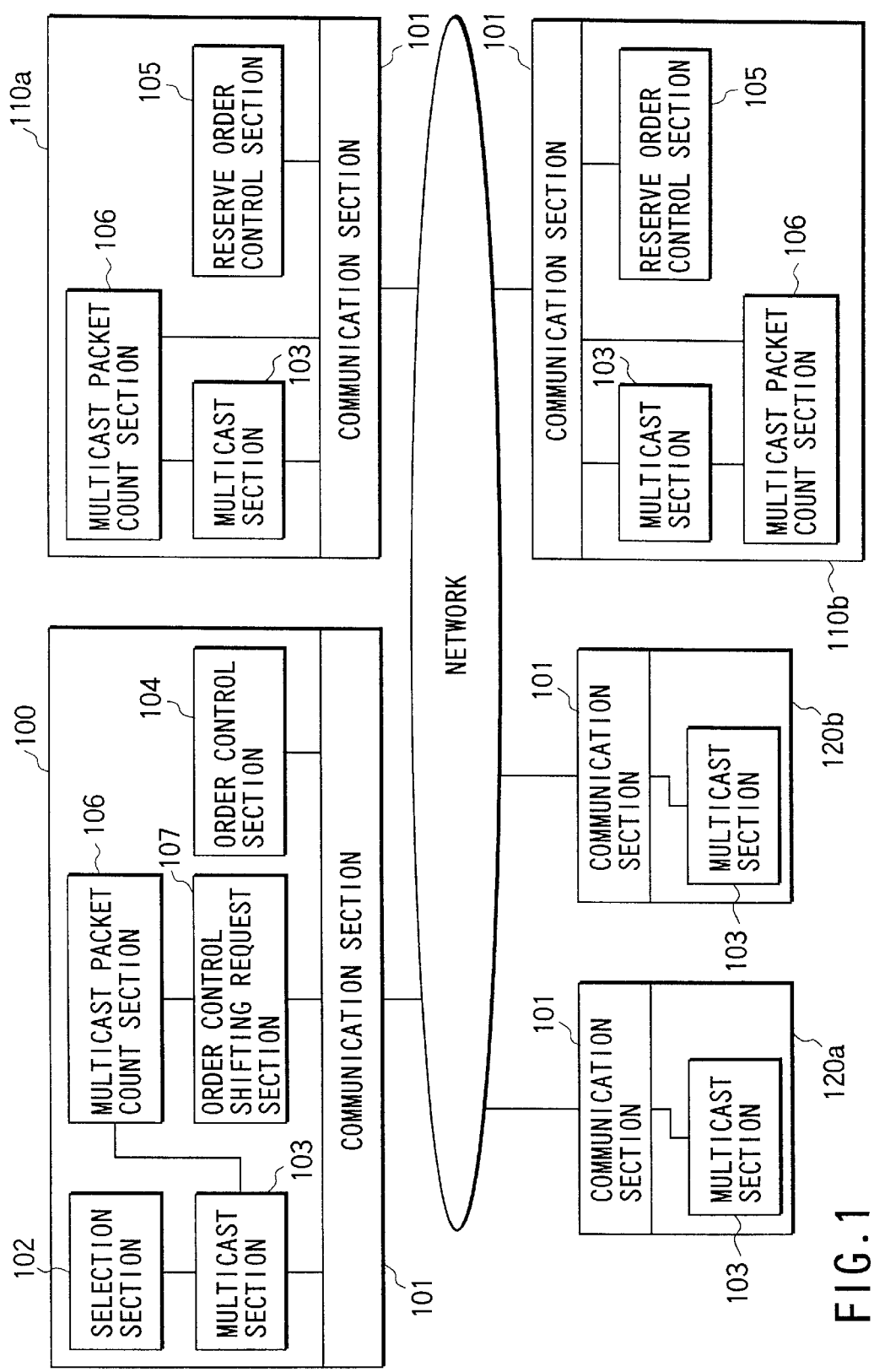
FIG. 1 is a block diagram showing an example of the arrangement of a communication system according to the first embodiment of the present invention.

Preferred embodiments of the present invention will be described hereinafter with reference to the accompanying drawings.

According to a communication system according to an embodiment of the present invention shown in FIG. 1, information communication terminals (to be simply referred to as terminals hereinafter) 101, 110a, 110b, 120a, and 120b such as personal computers and the like, which have a communication function, are connected to each other to be able to communicate with each other via a network. The terminal 100 mainly comprises communication section 101, selection section 102, multicast section 103, order control section 104, multicast packet count section 106, and order control shifting request section 107. Each of the terminals 110a and 110b mainly comprises a communication section 101, multicast section 103, reserve order control section 105, and multicast packet count section 106. Each of the terminals 120a and 120b comprises a communication section 101 and multicast section 103. The terminals 110a and 110b have the same arrangement, and so do the terminals 120a and 120b.

The terminals 100, 110a, 110b, 120a, and 120b according to this embodiment are implemented using personal computers, each of which comprises, e.g., an input device such as a touch panel, microphone, mouse, keyboard, and the like, an output device such as a loudspeaker, display, and the like, a large-capacity storage device such as a floppy disk drive, hard disk drive, and the like, a main memory, a CPU, and the like.

Especially, the functions of the individual sections in FIG. 1, and an application for executing information processing in, e.g., computerized conference, using the multicast communication method of the present invention are implemented by loading a storage medium (e.g., a floppy disk) which records a program for making the personal computer implement these functions into a floppy disk drive of the personal computer, and reading and executing the program recorded on the floppy disk by the personal computer (or its CPU).

Referring to FIG. 1, the communication section 101 performs communications among the terminals connected via the network. The selection section 102 selects a multicast group of terminals on the basis of, e.g., the user instruction, and informs the multicast sections 103 of the terminals in the group of the selected group. In FIG. 1, only the terminal 100 has the selection section 102. However, the terminals 110a and 110b, and terminals 120a and 120b may have the selection section 102. In FIG. 1, the selection section 102 selects one of the terminals 100, 110a, 110b, 120a, and 120b.

The multicast section 103 multicasts a multicast packet requested by an application which uses the communication system of this embodiment to the terminals in the group selected by the selection section 102. On the other hand, the multicast section 103 passes a multicast packet received from another terminal to the application. The multicast section 103 rearranges packets in the receive order informed from the order control section 104, and then passes them to the application, if necessary.

The receive order means numbers assigned to a plurality of multicast packets respectively transmitted from a plurality of terminals so as to maintain a given receive order of these multicast packets in all the terminals in the group upon receiving those packets by the terminals in the group. For example, assume that terminals A, B, C, and D form a multicast group, and terminals A and B respectively transmit multicast packets α and β (in this order or nearly simultaneously). At this time, if no order control based on the receive order is made, terminal C may receive these packets in the order of multicast packets α and β, and terminal D may receive these packets in the order of multicast packets β and α, due to the transfer route of the multicast packets, traffic on that network, and the like. Furthermore, terminal B may determine that these packets have been received in the order of multicast packets β and α. In order to avoid this, "1" and "2" are appended to multicast packets α and β as the receive order, and all terminals A to D in the group are controlled based on this order to receive the packets in the order of multicast packets α and β and to pass them to a host application.

Upon receiving an inquiry as to the receive order of a packet to be transmitted in the group from a terminal having a multicast packet, the order control section 104 determines the receive order of that multicast packet, and informs the request source terminal having a multicast packet of the determined receive order.

The reserve order control section 105 is started upon receiving an order control shifting request from the order control shifting request section 107, and starts order control similar to that of the order control section 104.

Each terminal may have the order control section 104 and reserve order control section 105, or a display section for informing the user of a change in multicast communication rate when the order control has been shifted. The user of each terminal can know the change in multicast communication rate when the terminal for performing the order control has been shifted to another terminal, and can change operation contents.

The multicast packet count section 106 counts the number of multicast packets transmitted from the multicast section 103, and informs the order control shifting request section 107 of that count. The multicast packet count section 106 is provided to a terminal having the order control section 104 or reserve control section 105.

The order control shifting request section 107 determines a terminal to which the order control is shifted, on the basis of the number of packets received from the multicast packet count section 106, and requests shifting of the order control function. In FIG. 1, the terminal 100 has the order control shifting request section 107. However, the terminals 110a and 110b, and terminals 120a and 120b may have the order control shifting request section 107. More specifically, at least one of terminals in the group which exchanges multicast packets need only comprise the order control shifting request section 107.

The flow of a multicast packet exchanged when a multicast terminal has an order control section 104 will be explained below with reference to the flow chart shown in FIG. 2.

For example, in a window sharing application of a computerized conference system, when the user of the application accesses data shared by the terminals, a multicast request is issued to the multicast section 103, and the multicast section 103 is started in response to that request (step S11).

Upon receiving the multicast request, the multicast section 103 inquires as to the receive order of a multicast packet to be transmitted of the order control section 104 (step S12).

Upon receiving the inquiry of the receive order of the multicast packet, the order control section 104 informs the multicast section 103 of a number next to the receive order sent in response to the last inquiry (step S13). For example, if the number informed as the receive order in response to the last inquiry is "2", the order control section 104 informs the multicast section 103 of the next number "3" as the receive order.

Upon receiving the receive order information of the multicast packet from the order control section 104, the multicast section 103 appends the informed receive order to a multicast packet to be transmitted (e.g., it writes the receive order in a predetermined field of a packet header), and multicasts the multicast packet to the multicast sections 103 of all the terminals in the group selected by the selection section 102 via the communication section 101 (step S14).

The multicast section 103 of each receiving terminal receives the multicast packet via the communication section 101 (step S15). The multicast section 103 checks if the receive order appended to that received multicast packet (e.g., written in the predetermined field of the header of that packet) indicates a number next to the received order appended to the last multicast packet passed to the application on the terminal (step S16). For example, if the receive order appended to the last multicast packet passed to the application on the terminal is "2", it is checked if the currently received receive number is "2".

If it is determined in step S16 that the received multicast packet is not a multicast packet assigned the next number (for example, if the receive order appended to the last multicast packet passed to the application on that terminal is "2", and the currently received receive number is "4"), the multicast section 103 holds the received multicast packet, and ends the processes (step S20).

If it is determined in step S16 that the received multicast packet is a multicast packet assigned the next number, the multicast section 103 passes that received multicast packet to the application (step S17).

After step S17, the multicast section 103 confirms if it holds a multicast packet appended as the receive order a number next to the receive order appended to the multicast packet which was passed to the application in step S17 (step S18). For example, if the receive order appended to the multicast packet which was passed to the application on that terminal in step S17 is "2", it is checked if the receive order of the multicast packet held in the multicast section 103 in step S20 is "4".

If the multicast section 103 holds the multicast packet appended as the receive order a number next to the receive order appended to the multicast packet which was passed to the application, it passes the multicast packet appended as the received order the next number to the application (step S19), and the flow then returns to step S18.

If it is determined in step S18 that the multicast section 103 does not hold any multicast packet appended as the receive order a number next to the receive order appended to the multicast packet which was passed to the application in step S17, the processing ends.

Figure 3:
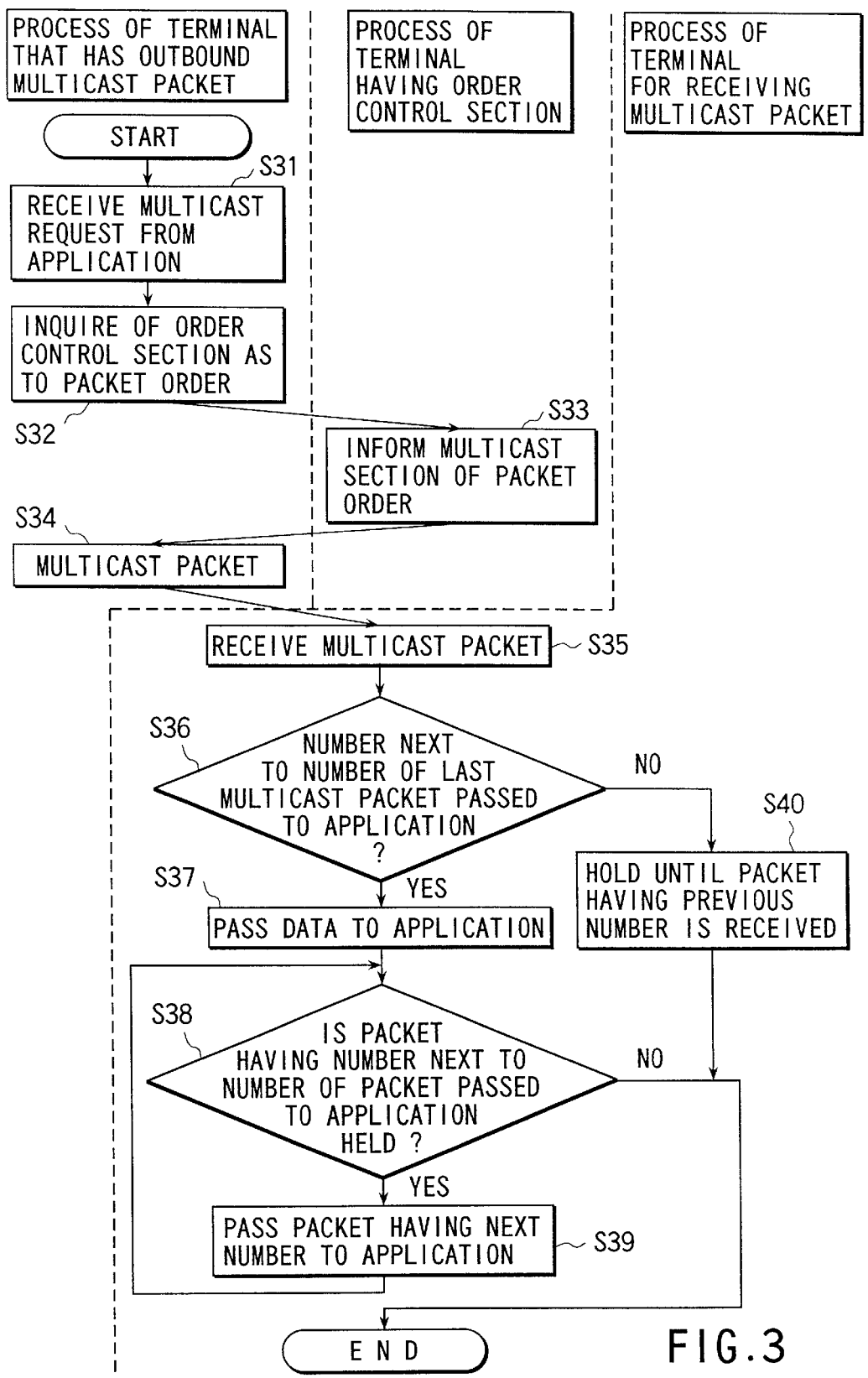
FIG. 3 is a flow chart for explaining the processes upon exchanging multicast packets, when a terminal for performing a multicast differs from the terminal having the order control section.

The flow of multicast packets when the multicast terminal differs from the terminal having the order control section 104 will be explained below with reference to the flow chart shown in FIG. 3.

Figure 2:
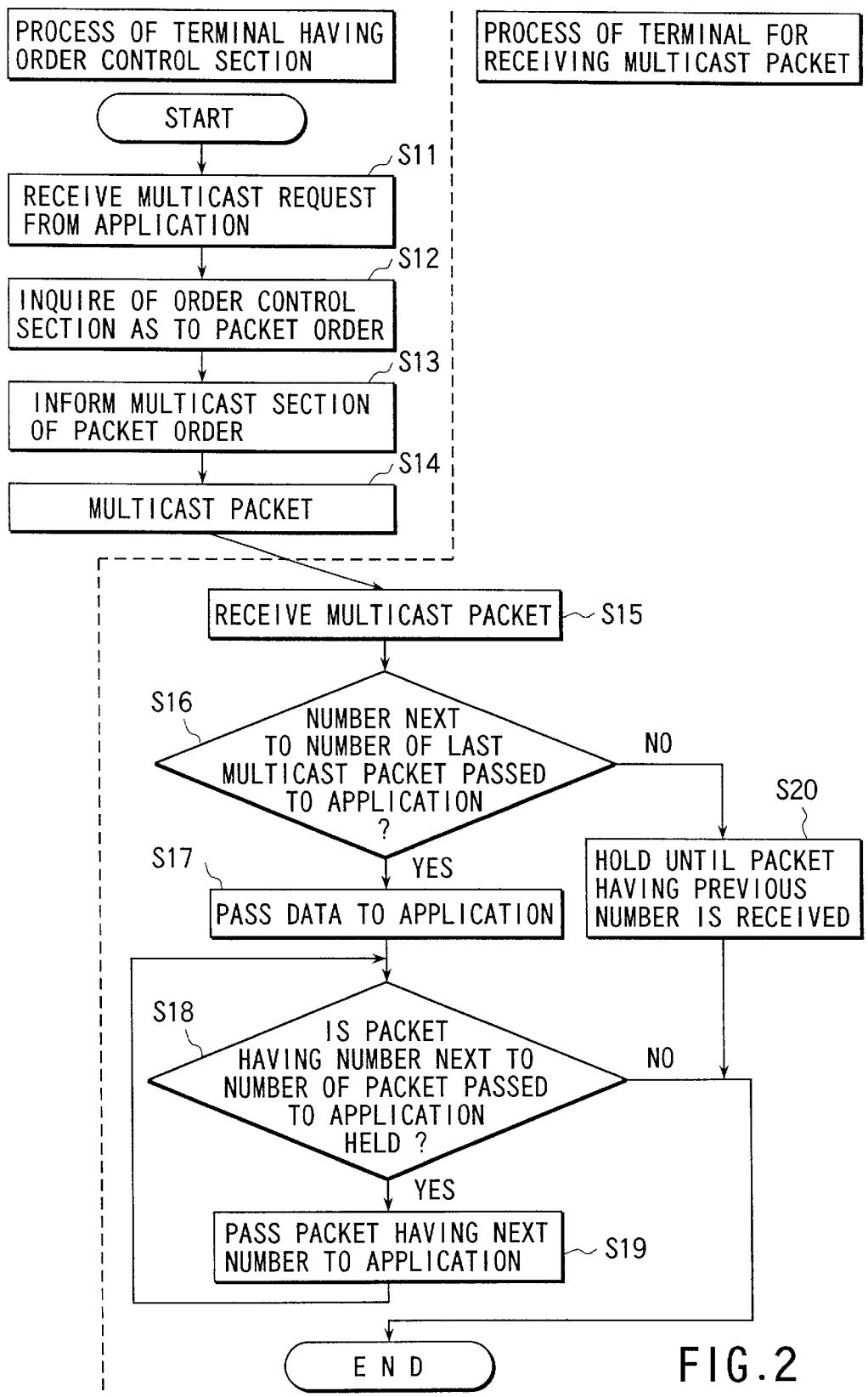
FIG. 2 is a flow chart for explaining the processes upon exchanging multicast packets, when a terminal for performing a multicast has an order control section.

When the multicast section 103 has received a multicast request (step S31) as in step S11 in FIG. 2, it transmits a message for inquiring the receive order of a multicast packet to be transmitted to the terminal having the order control section 104 via the communication section 101 (step S32).

Upon receiving the message, the terminal having the order control section 104 transmits a number next to the number which has been informed as the receive order in response to the last request to the multicast section 103 of the inquiry source terminal via the communication section 101 (step S33).

Upon receiving the packet receive order from the order control section 104, the multicast section 103 transmits the multicast packet to be transmitted to the multicast sections 103 of the respective terminals in the group selected by the selection section 102 via the communication section 101 (step S34).

Since the subsequent processes (steps S35 to S39) of the multicast packet at the receiving terminal are the same as those (steps S15 to S19 in FIG. 2) when the multicast terminal has the order control section 104 in FIG. 2), a detailed description thereof will be omitted.

In this manner, when the multicast terminal differs from the terminal having the order control section 104, data must be exchanged via the network to inquire the order of packets, and more communications must be made via the network than the case wherein the multicast terminal has the order control section 104.

The order control shifting method will be explained below. Two order control shifting methods are available.

Figure 4:
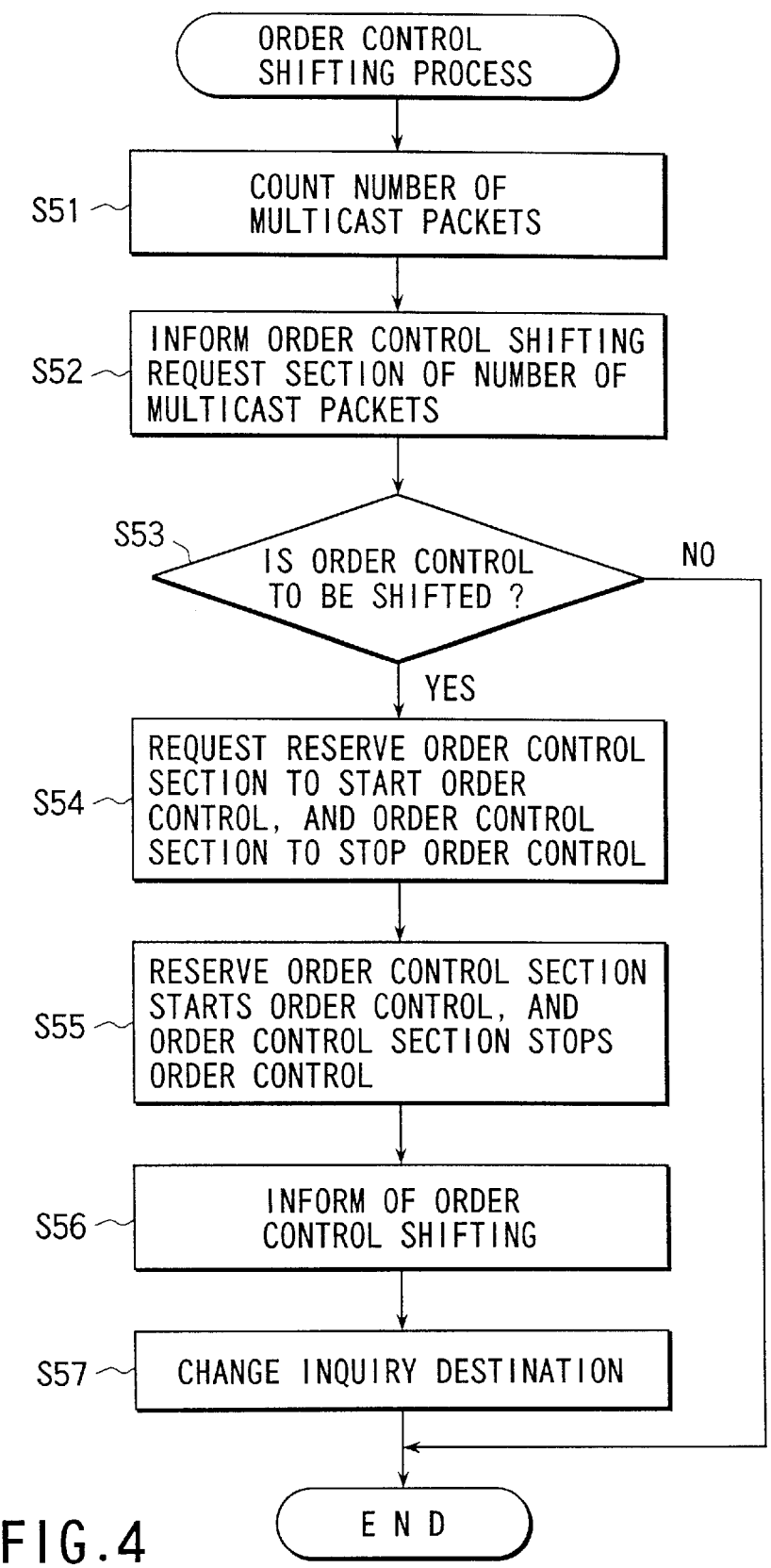
FIG. 4 is a flow chart for explaining the first order control shift process.

The first order control shifting processes will be explained first with reference to the flow chart shown in FIG. 4.

The multicast packet count section 106 is provided to the terminal which has the order control section 104 or reserve order control section 105, as shown in FIG. 1, and counts the number of multicast packets from the beginning of multicast in a given group until a predetermined period of time elapses or until an instruction is received from the user or application (step S51).

The count section 106 informs the order control shifting request section 107 of the counted number of multicast packets via the communication section 101 (step S52).

The order control shifting request section 107 checks based on the informed number of multicast packets if the order control is to be shifted (step S53).

If the order control shifting request section 107 determines in step S53 that the order control is not to be shifted, the processing ends.

If the order control shifting request section 107 determines in step S53 that the order control is to be shifted, it requests the reserve order control section 105 of the terminal to which the control is to be shifted to start order control, and requests the order control section 104 or reserve order control section 105 which is currently executing the order control to stop the order control (step S54).

Upon receiving the order control start request, the reserve order control section 105 starts the order control (step S55).

The order control shifting request section 107 informs the multicast sections 103 of other terminals in the group that the order control has been shifted to another terminal (step S56).

Upon receiving the order control shift message, each terminal changes the order inquiry destination upon transmitting a multicast packet to the reserve order control section 105 which has started the order control (step S57).

The methods of determining whether or not the control is to be shifted in step S53 will be explained below.

In the first method, the order control shifting request section 107 selects a terminal with the largest number of multicast packets on the basis of the number of multicast packets received from the multicast packet count section 106, and checks if the selected terminal has the order control section 104 or reserve order control section 105. When the order control section 104 or reserve order control section 105 of that terminal is not currently active, the section 107 determines that the order control is to be shifted to that terminal.

In the second method, the order control shifting request section 107 selects a terminal with the largest number of multicast packets on the basis of the number of multicast packets received from the multicast packet count section 106, and when the number of packets multicasted by the selected terminal is sufficiently larger than the number of packets multicasted by the terminal having the order control section 104, the section 107 determines that the order control is to be shifted to that selected terminal.

If the respective terminals multicast nearly the same numbers of packets, and the first method is used in such case, nearly no effects of order control shifting are obtained, and order control shifting merely increases the load on the communication system. Therefore, in such case, the second method is effective.

With these methods, the order control can be shifted to the terminal which transmits more multicast packets, and the amount of transmit/receive data required for the order control can be reduced, thus achieving high-speed multicast communications.

The second order control shifting processes will be described below.

Figure 5:
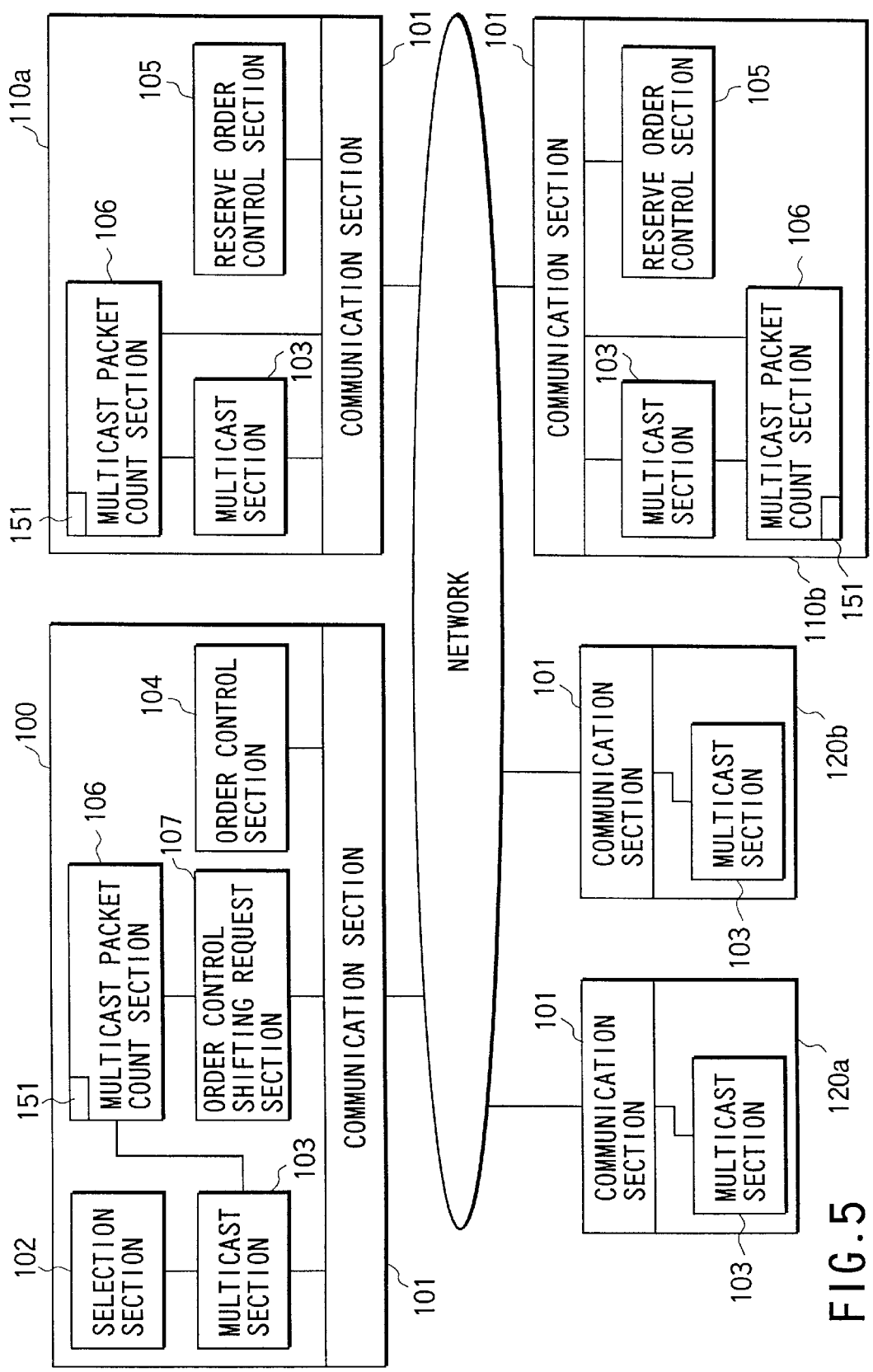
FIG. 5 is a block diagram showing an example of the arrangement of the communication system when a multicast packet count section comprises a time measurement section.

The multicast packet count section 106 in the second order control shifting processes has a time measurement section 151, and counts the number of packets transmitted from the multicast section 103, as shown in FIG. 5. The multicast packet count section 106 in the second order control shifting processes will be referred to as a transmitted multicast packet count section 106 hereinafter.

The time measurement section 151 measures the time set in advance by, e.g., the user, and informs the transmitted multicast packet count section 106 of the lapse of time every time the time has elapsed. The time to be set in the time measurement section 151 can be changed anytime. If infinite time is set, the time measurement section 151 does not inform the transmitted multicast packet count section 106 of any data.

Figure 6:
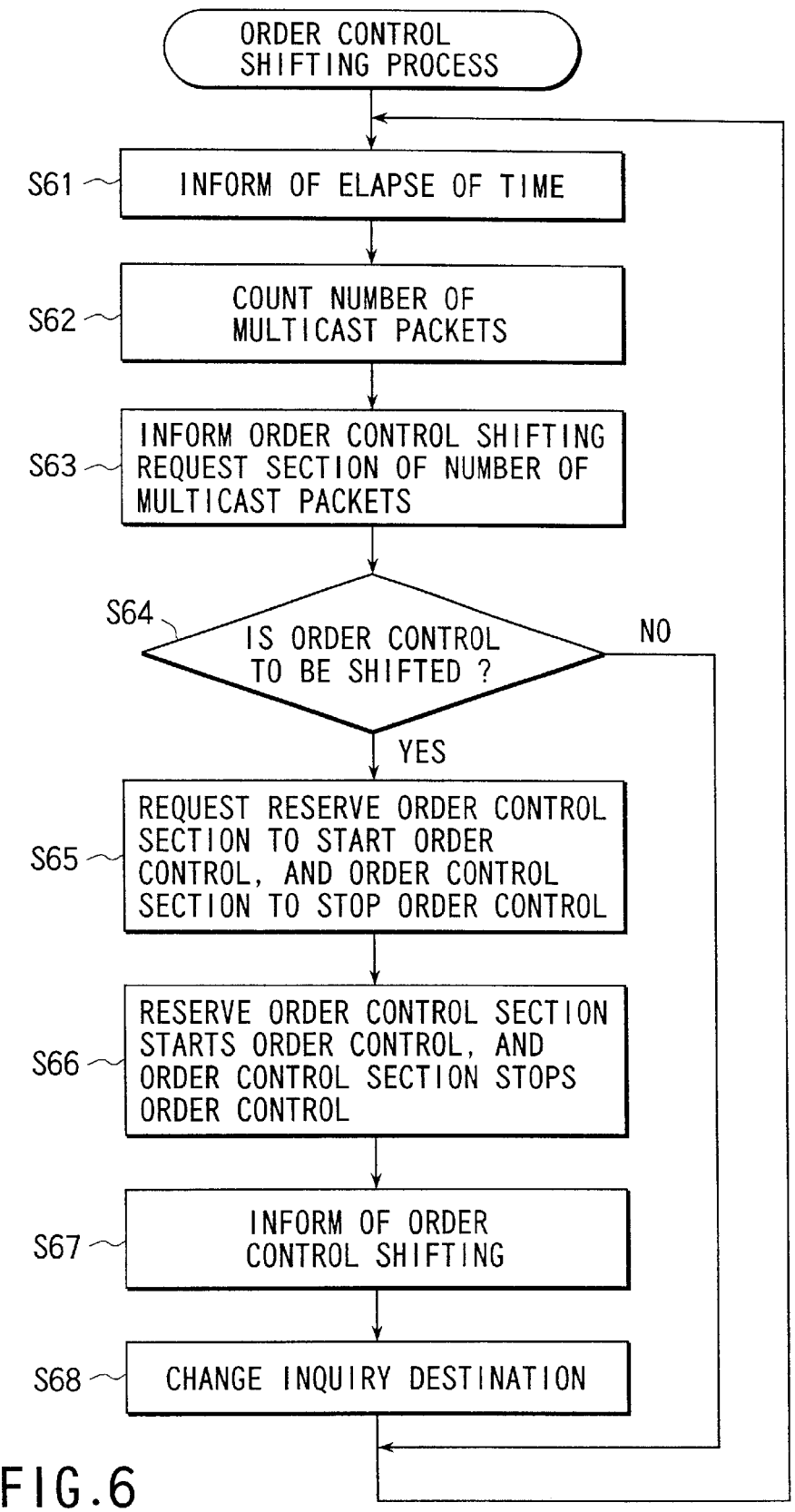
FIG. 6 is a flow chart for explaining the second order control shift process.

The second order control shifting processes will be explained below with reference to the flow chart shown in FIG. 6.

The transmitted multicast packet count section 106 receives a message indicating a lapse of the setup time from the time measurement section 151 (step S61).

The transmitted multicast packet count section 106 counts the number of multicast packets transmitted from the multicast section 103 from the previous lapse message of the setup time until the current lapse message of the setup time (step S62). If the section 106 receives the lapse message of the setup time for the first time, it counts the number of packets from the beginning of multicast communications until the first lapse message of the setup time.

The transmitted multicast packet count section 106 informs the order control shifting request section 107 of the counted number of multicast packets via the communication section 101 (step S63).

The order control shifting request section 107 checks based on the informed number of multicast packets if the order control is to be shifted (step S64).

If the order control shifting request section 107 determines that the order control is not to be shifted, the processing ends.

If the order control shifting request section 107 determines that the order control is to be shifted, it requests the reserve order control section 105 of the terminal to which the order is to be shifted to start order control, and requests the order control section 104 or reserve order control section 105 which is currently executing the order control to stop the order control (step S65).

Upon receiving the order control start request, the reserve order control section 105 starts the order control, and upon receiving the order control stop request, the order control section 104 or reserve order control section 105 stops the order control (step S66). The order control section 104 which has stopped the order control starts the same operation as that of the reserve order control section 105 which waits for an order control start request.

The order control shifting request section 107 informs the multicast sections 103 of other terminals in the group that the order control has been shifted to another terminal (step S67).

Upon receiving the order control shift message, each terminal changes the order inquiry destination upon transmitting a multicast packet to the reserve order control section 105 which has started the order control (step S68).

According to the second order control shifting processes, the order control can be shifted to the terminal which transmits a greater number of multicast packets, and the amount of transmit/receive data required for the order control (or inquiring the receive order) can be reduced, thus achieving high-speed multicast communications.

Since the order control shift is repeated every time the time measurement section 151 informs of the lapse of time, even when the terminal which transmits a greater number of multicast packets changes along with a lapse of time, the order control can be shifted to the terminal which transmits a greater number of multicast packets to follow such change.

As described above, since the a token of the order control is shifted to the terminal for transmitting more multicast packets and the amount of transmit/receive data required for the order control can be reduced, high-speed multicast communications can be achieved while maintaining an identical receive order of multicast packets among a plurality of terminals upon exchanging multicast packets among these terminals.

The second embodiment of the present invention will be explained below.

Figure 7:
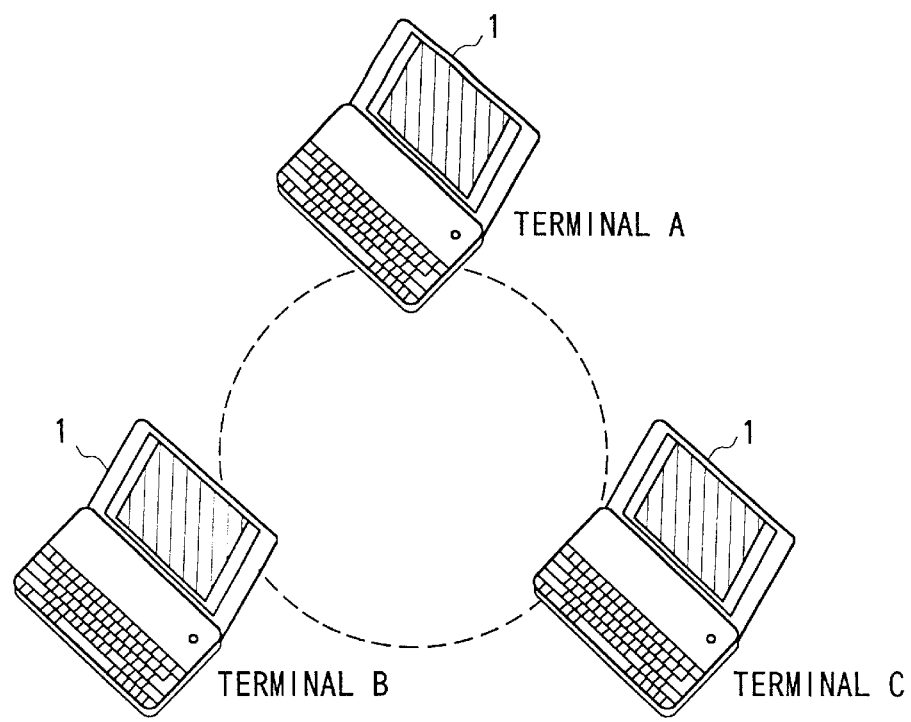
FIG. 7 is a view showing the arrangement of a network of a multicast group consisting of a plurality of terminals in the second embodiment.
Figure 8:
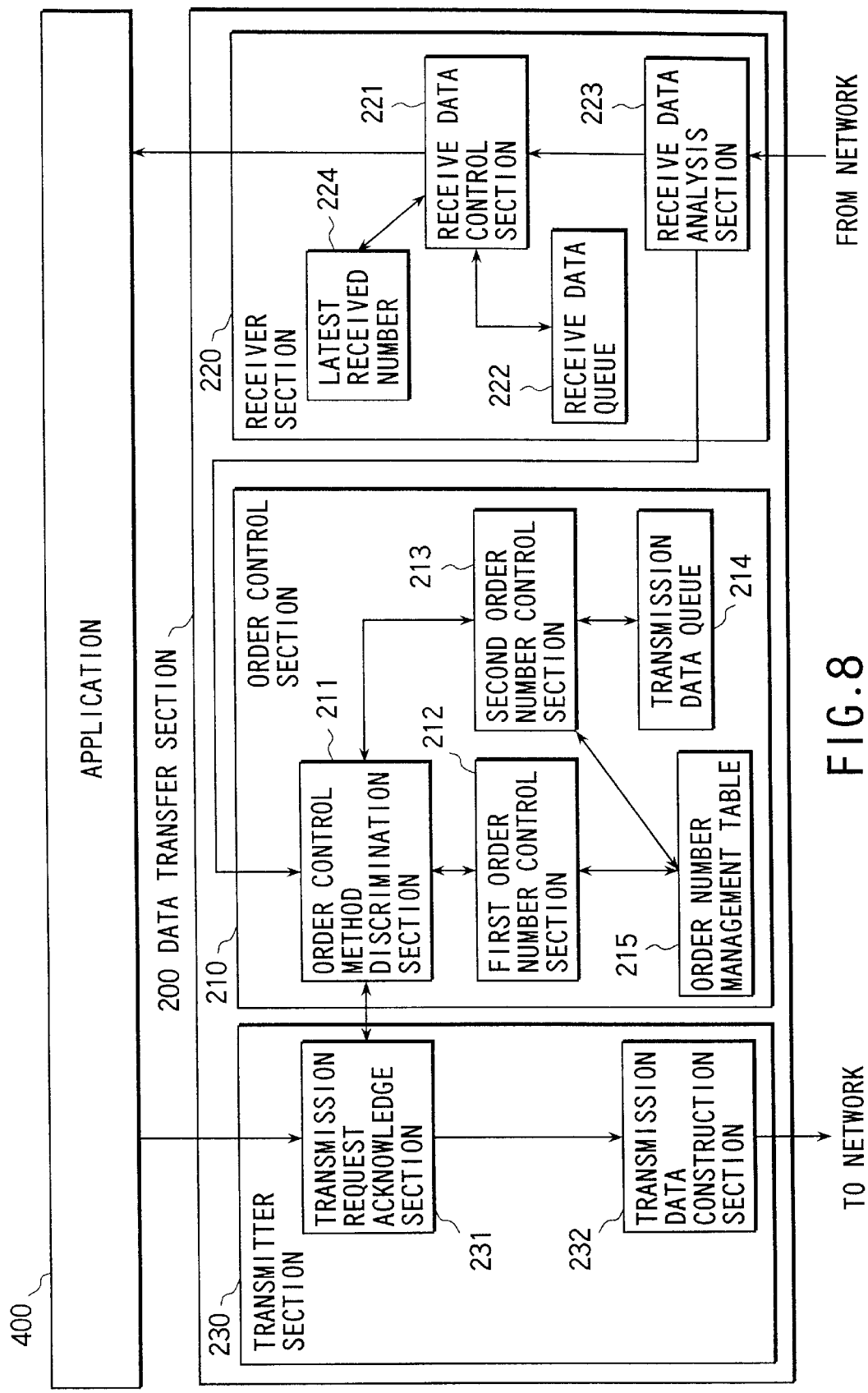
FIG. 8 is a block diagram showing an example of the arrangement of a terminal according to the second embodiment.

Each of terminals A, B, and C that build a network of a multicast group, as shown in FIG. 7, has an arrangement shown in, e.g., FIG. 8.

Each terminal is roughly constructed by an application 400 which implements information processing such as computerized conference and the like, and a data transfer section 200. The data transfer section 200 comprises a transmitter section 230 for transmitting a packet onto the network in response to a transmission request from the application 400 or an order control section 210, the order control section 210 for making control for maintaining order consistency of multicast data in a given group, and a receiver section 220 for receiving a packet from the network, and delivering that packet to the application 400 or order control section 210.

Terminals A, B, and C according to this embodiment are implemented using personal computers each of which comprises, e.g., an input device such as a touch panel, microphone, mouse, keyboard, and the like, an output device such as a loudspeaker, display, and the like, a large-capacity storage device such as a floppy disk drive, hard disk drive, and the like, a main memory, a CPU, and the like.

Especially, the functions of the application 400 and data transfer section 200 shown in FIG. 8 are implemented by loading a storage medium (e.g., a floppy disk) which records a program for making the personal computer implement these functions into a floppy disk drive of the personal computer, and reading and executing the program recorded on the floppy disk by the personal computer (or its CPU).

The arrangement of the data transfer section 200 will be explained below. The data transfer section 200 comprises the transmitter section 230, order control section 210, and receiver section 220. The transmitter section 230 comprises a transmission request acknowledge section 231 and transmission data construction section 232. The order control section 210 comprises an order control method discrimination section 211, first and second order number control sections 212 and 213, order number management table 215, and transmission data queue 214. The receiver section 220 comprises receive data control section 221, receive data queue 222, and receive data analysis section 223.

The transmission request acknowledge section 231 in the transmitter section 230 requests the order control section 210 (or the order control method discrimination section 211 thereof) to execute order control for transmitting multicast data upon receiving a multicast transmission request from the application 400, and passes a packet to the transmission data construction section 232 upon receiving a packet transmission request from the order control method discrimination section 211 in the order control section 210.

The transmission data construction section 232 interfaces to output a packet onto the network connected. For example, the section 232 converts the packet to be output onto the network into a format suitable for that network, and executes a predetermined protocol process for transferring that packet.

The order control method discrimination section 211 in the order control section 210 selects one of the first and second order number issue procedures on the basis of the size (length) of multicast data to be transmitted upon receiving an order control request from the transmission request acknowledge section 231. In accordance with the selection result, the processing is switched to one of the first and second order number control sections 212 and 213.

Figure 12:
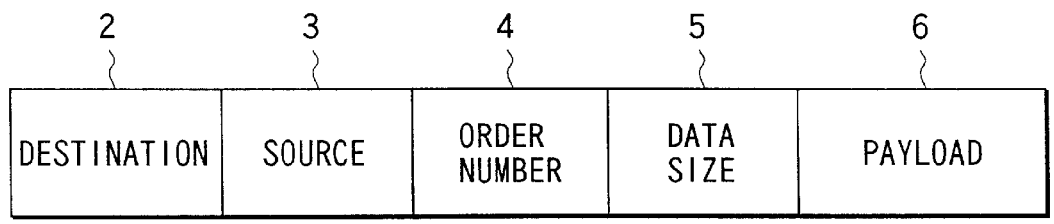
FIG. 12 shows an example of the format of an order number issue request packet formed by a first order number control section.
Figure 13:
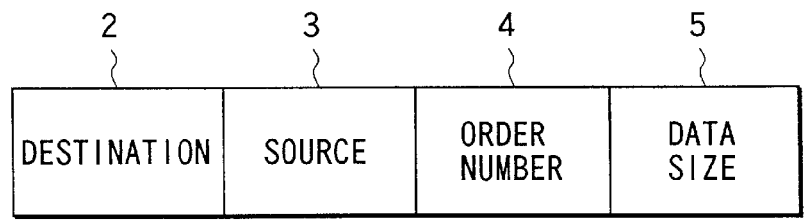
FIG. 13 shows an example of the format of an order number issue request packet formed by a second order number control section.

When the self terminal is an order number issue terminal, the first order number control section 212 issues an order number to multicast data to be transmitted from the self terminal with reference to the order number management table 215, and writes the issued order number in order number field 4 in a packet with the format shown in FIG. 12. On the other hand, when the self terminal is not an order number issue terminal, the section 212 generates an order number issue request packet with the format shown in FIG. 13. When the self terminal is an order number issue terminal, and an order number issue request packet shown in FIG. 13 is received from another terminal, the section 212 issues an order number with reference to the order number management table 215, and writes the issued order number in order number field 4.

When the self terminal is an order number issue terminal, the second order number control section 213 issues an order number to multicast data to be transmitted from the self terminal with reference to the order number management table 215, and writes the issued order number in order number field 4 in a packet with the format shown in FIG. 12. On the other hand, when the self terminal is not an order number issue terminal, the second order number control section 213 temporarily saves multicast data to be transmitted from the self terminal in the transmission data queue 214, and generates an order number issue request packet with the format shown in FIG. 13, which is addressed to an order number issue terminal. On the other hand, upon receiving a packet with the format shown in FIG. 13 to inform an order number from an order number issue terminal, the second order number control section 213 extracts the corresponding multicast data from the transmission data queue 214, writes it in the payload, and writes the order number in order number field 4, thus generating a packet with the format shown in FIG. 12.

When the second order number issue procedure is selected with respect to multicast data to be transmitted from the self terminal, the transmission data queue 214 temporarily stores the multicast data to be transmitted until an order number is issued when the self terminal is not an order number issue terminal.

The order number management table 215 is referred to by the first and second order number control sections 212 and 213 upon issuing a new order number, and can issue serial order numbers by distinguishing issued and unissued order numbers (without issuing repetitive order numbers).

The receive data analysis section 223 in the receiver section 220 checks the contents in destination field 2 and order number field 4 of a packet received from the network, and identifies an order number issue request packet, and a multicast data transfer packet having the order number from each other. When the packet is an order number issue request packet, and the self terminal is an order number issue terminal, the receive data analysis section 223 requests the order control method discrimination section 211 to issue an order number. On the other hand, when the packet is a multicast data transfer packet, the receive data analysis section 223 stores multicast data contained in that packet in the receive data queue 222, and informs the receive data control section 221 of reception of multicast data.

The receive data queue 222 temporarily stores multicast data to pass multicast data received in accordance with the order number to the application 400.

The receive data control section 221 passes multicast data stored in the receive data queue 222 to the application 400 in accordance with the order numbers assigned thereto, while comparing a latest received number 224 with the order numbers of multicast data stored in the receive data queue 222.

The two different order number issue procedures between terminals in a given group will be briefly explained below with reference to the sequence charts shown in FIGS. 14 and 15.

Figure 14:
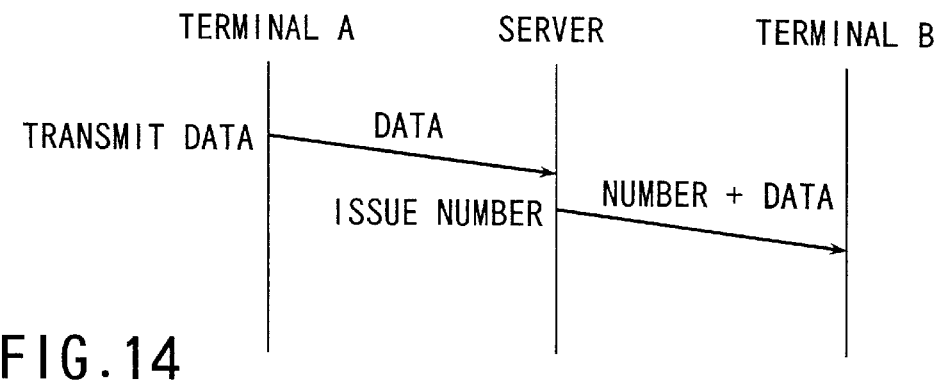
FIG. 14 is a schematic sequence chart showing the first order number issue procedure.

FIG. 14 shows the first order number issue procedure. When the terminal A transmits multicast data to the terminal B, the terminal A writes the multicast data in payload 6 in a packet with the format shown in FIG. 12, and transmits that packet. The header of the packet format shown in FIG. 12 has destination field 2, source field 3, order number field 4, and data size field 5 in which the size of multicast data to be written in payload 6 is written.

An identifier of an order number issue terminal (server) is written in destination field 2 in the packet transmitted from the terminal A, the identifier of the terminal A is written in source field 3, "NULL" indicating that a receive number is not issued yet is written in receive number (order number) field 4, and the data size of the multicast data written in payload 6 is written in data size field 5.

In this case, data can be sent to the terminal B using a minimum of two packets. However, if multicast data becomes long, the packet to be transmitted is segmented on the network level. For example, in case of Ethernet, the data length which can be transferred per packet is 1.5 kbytes. For this reason, when 150-kbyte multicast data is sent from the terminal A using the first order number issue procedure, the terminal A transmits data using a packet with the format shown in FIG. 14 to an order number issue terminal (server).

After the server issues the order number, the order number is written in order number field 4, and the packet is then transmitted to the terminal B. Hence, the total number of packets sent onto the network is 100×2=200, i.e., 100 packets from the terminal A to the server, and 100 packets from the server to the terminal B.

Figure 15:
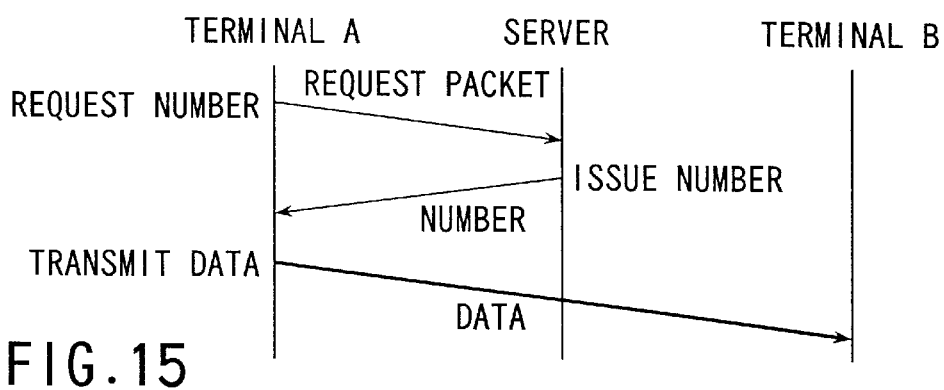
FIG. 15 is a schematic sequence chart showing the second order number issue procedure.

A case will be examined wherein this 150-kbyte data is transmitted to the terminal B using the second order number issue procedure shown in FIG. 15. In this case, the terminal A outputs a packet for an order number issue request, which does not contain any payload 6, as shown in FIG. 13.

The terminal A transmits the packet for the order number issue request shown in FIG. 13 to the server. Upon receiving this packet, the server issues the order number, and informs the terminal A of the order number. The terminal A writes the informed order number in order number field 4, writes multicast data in payload 6, and then transmits the packet to the terminal B. Hence, if the number of packets required for the order number issue request is "2", only 102 packets (=2+100) need be transmitted.

Hence, the second order number issue procedure is more efficient than the first procedure in such case. However, when the multicast data size is smaller than 1.5 kbytes, the number of packets required using first order number issue procedure can be smaller by one than that required using the second procedure.

The sizes of data exchanged by, e.g., shared edit applications or the like after the multicast group shown in FIG. 7 is constructed include various sizes of data such as graphic data having a large size, text data having a relatively small size, and the like.

Hence, in such case, the method of the present invention, which can dynamically select one of the first and second order number issue procedures in accordance with the multicast data size is effective.

The processes of terminal 1 will be explained below on the basis of the aforementioned principle. That is, the processing sequence executed when a plurality of terminals 1 form a group on the network, as shown in FIG. 7, and exchange certain multicast data will be explained below with reference to the flow charts shown in FIGS. 9 to 11. Note that at least one of a plurality of terminals A, B, and C in the group shown in FIG. 7 is set in advance as an order number issue terminal.

The processes of terminal 1 upon transmitting a packet will be explained first with reference to the flow chart shown in FIG. 9.

If the application 400 requests the transmission request acknowledge section 231 of multicast data transmission (step S101), the transmission request acknowledge section 231 issues an order control request to the order control method discrimination section 211 of the order control section 210 (step S102).

The order control method discrimination section 211 checks the length of the multicast data to be transmitted, which was passed from the application 400, and if the length is equal to or smaller than a predetermined threshold value, the section 211 issues an order control request to the first order number control section 212; otherwise, the section 211 issues an order control request to the second order number control section 213 (step S103).

The threshold value for the data length is used to determine one of the first and second order number issue procedures upon transferring multicast data. For example, the threshold value is the maximum data length with which requesting the order number issue for multicast data using a packet having payload 6 shown in FIG. 12 (i.e., the first order number issue procedure) is estimated to allow more efficient packet transfer than the second order number issue procedure in accordance with the network configuration and traffic. This value may be statistically calculated in advance.

Upon receiving the order number issue request, the first order number control section 212 checks if the self terminal is an order number issue terminal (step S104). If the self terminal is an order number issue terminal, the section 212 issues an order number with reference to the order number management table 215 (step S105). The first order number control section 212 forms a packet with the format shown in FIG. 12. More specifically, the section 212 writes the issued order number in order number field 4, multicast data in payload 6, an identifier of a terminal in the group or an identifier (group identifier) indicating a packet to be multicasted to the terminals in the group in destination field 2, and the identifier of the self terminal in source field 3.

After that, the formed packet is sent onto the network via the transmission request acknowledge section 231 and transmission data construction section 232 (step S106).

If it is determined in step S104 that the self terminal is not an order number issue terminal, the first order number control section 212 forms an order number issue request packet in the packet format shown in FIG. 12, i.e., with the identifier of the order number issue terminal in destination field 2 and "NULL" in order number field 4 (steps S107 and S108), and sends that packet to the order number issue terminal via the transmission request acknowledge section 231 and transmission data construction section 232 (step S106). If it is determined in step S107 that an order number issue request is received from a terminal other than the self terminal, that request is discarded (step S109).

On the other hand, upon receiving the order number issue request in step S103, the second order number control section 213 checks if the self terminal is an order number issue terminal (step S110). If the self terminal is an order number issue terminal, the section 213 issues an order number with reference to the order number management table 215 (step S111). The second order number control section 213 forms a packet with the format shown in FIG. 12. That is, the section 231 writes the issued order number in order number field 4, multicast data in payload 6, an identifier of a terminal in the group or an identifier (group identifier) indicating a packet to be multicasted to the terminals in the group in destination field 2, and the identifier of the self terminal in source field 3. The section 213 then outputs the packet onto the network via the transmission request acknowledge section 231 and transmission data construction section 232 (step S106).

If the second order number control section 213 determines in step S110 that the self terminal is not an order number issue terminal, it temporarily saves transmission data in the transmission data queue 214 (step S113), forms an order number issue request packet with the packet format shown in FIG. 13, which is addressed to the order number issue terminal (step S114), and sends that packet to the order number issue terminal via the transmission request acknowledge section 231 and transmission data construction section 232 (step S106). If it is determined in step S113 that an order number issue request is received from a terminal other than the self terminal, that request is discarded (step S115).

The processes of the terminal upon receiving a packet will be explained below with reference to the flow chart shown in FIG. 10.

Upon receiving a packet from the network (step S120), the receive data analysis section 223 in the receiver section 220 of the terminal A, B or C checks destination field 2 in the received packet to see if that packet is addressed to the self terminal (step S121). If the packet is not addressed to the self terminal (i.e., the group identifier is not set), the section 223 discards the packet (step S132).

If the packet is addressed to the self terminal, the receive data analysis section 223 checks order number field 4 of the received packet to see if the order number has already been issued (step S122). If the order number has not been issued yet (e.g., no order number is written in order number field 4, or "NULL" is written), and the self terminal is an order number issue terminal (step S124), the section 223 requests the order control method discrimination section 211 to issue an order number (step S130). On the other hand, if the order number has not been issued yet, and the self terminal is not an order number issue terminal, the section 223 discards the packet (step S131).

In step S130, if the received packet has payload 6 (e.g., the packet has the format shown in FIG. 12), the order control method discrimination section 211 issues an order control request to the first order number control section 212; if the packet has no payload (e.g., the packet has the format shown in FIG. 13), the section 211 issues an order control request to the second order number control section 213. The first or second order number control section 212 or 213 issues an order number with reference to the order number management table 215, and writes the issued order number in order number field 4, and also a group identifier in the group in destination field 2 in case of the format shown in FIG. 12. The section 212 or 213 then outputs the packet onto the network via the transmission request acknowledge section 231 and transmission data construction section 232.

If the receive data analysis section 223 determines in step S122 based on order number field 4 of the received packet that the order number has already been issued (order number is written), the section 223 checks data size field 5 and payload 6 of the received packet (step S123) to see if multicast data is appended. If the multicast data is appended, the section 223 stores the multicast data in the receive data queue 222 (step S128), and informs the receive data control section 221 of reception of the data (step S129).

If it is determined in step S123 that the received packet has no payload 6, as shown in FIG. 13, the receive data analysis section 223 passes the received packet to the order control method discrimination section 211 in the order control section 210. The order control method discrimination section 211 receives the order number in the received packet, and passes it to the second order number control section 213. The second order number control section 213 extracts multicast data with the corresponding order number from the transmission data queue 214 (step S125), and forms a packet with the format shown in FIG. 12 by writing that data in payload 6, the order number in order number field 4 (step S126), a group identifier in destination field 2, and the like. Then, the section 213 outputs the packet onto the network via the transmission request acknowledge section 231 and transmission data construction section 232 (step S127).

Figure 11:
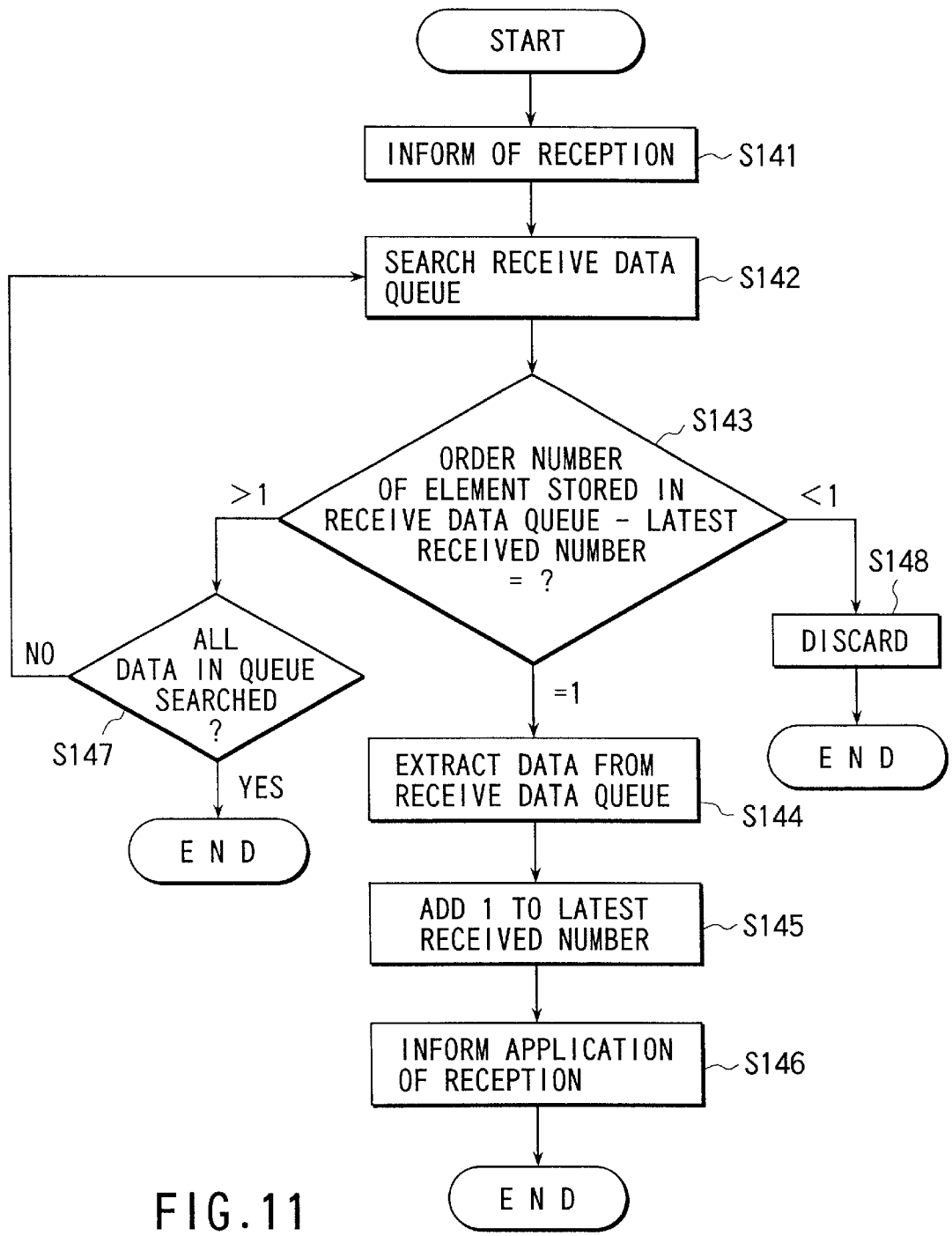
FIG. 11 is a flow chart showing the processes when a receive data control section is informed of reception of multicast data.

The processes executed after the receive data control section 221 is informed of reception of the multicast data in step S129 will be described below with reference to the flow chart shown in FIG. 11.

If the receive data control section 221 is informed of reception of the multicast data in step S129 (step S141 in FIG. 11), the section 221 searches the order numbers appended to multicast data stored in the receive data queue 222 (step S142), and compares the differences between the order numbers of multicast data in the receive data queue 222 and the latest received number (the order number appended to the latest data that has been passed to the application 400) (step S143). If the section 221 finds an order number corresponding to the difference=1 in the receive data queue 222, it extracts multicast data of that order number (step S144). That is, the section 221 extracts multicast data appended with an order number next to the latest received number from the receive data queue 222. The section 221 then updates the latest received number by adding "1" to it (step S145). The extracted multicast data is passed to the application 400 (step S146).

If it is determined in step S143 that the receive data queue 222 stores only multicast data with order numbers which have differences larger than "1" from the latest received number, the processing is suspended (until multicast data having an order number next to the latest received number is received) (step S147). On the other hand, if the receive data queue 222 stores multicast data with order numbers equal to or smaller than the latest received number 224, since these data have already been passed to the application 400, they may be discarded (step S148).

The third embodiment of the present invention will be described below with reference to FIGS. 16 to 20. In this embodiment, assume that one of terminals A, B, and C that construct the network shown in FIG. 7 is a server terminal, and other terminals are client terminals.

Figure 16:
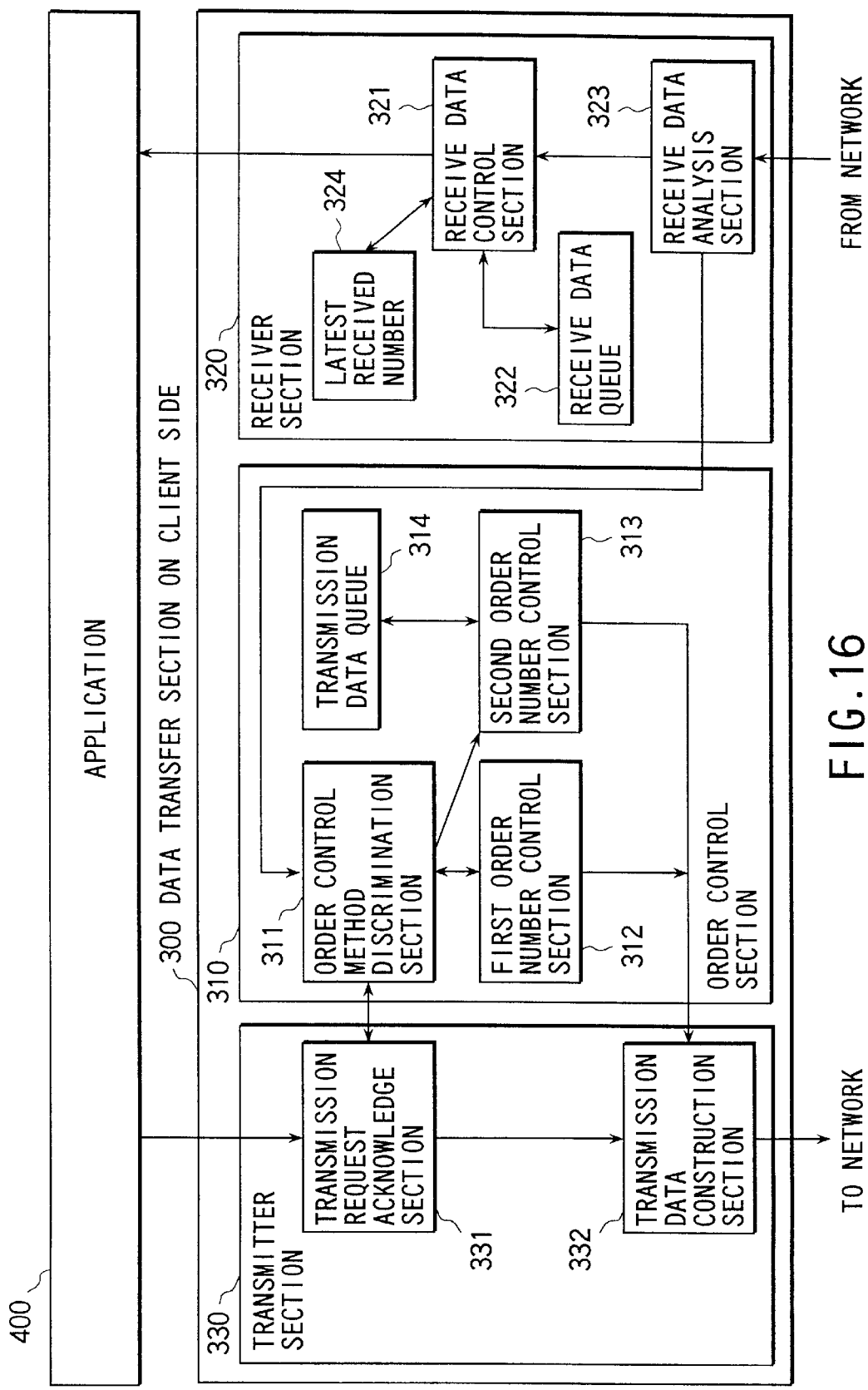
FIG. 16 is a block diagram showing an example of the arrangement of a client terminal according to the second embodiment of the present invention.

Each client terminal is roughly constituted by an application 400 that implements information processing such as computerized conference and the like, and a data transfer section 300, as shown in FIG. 16. The data transfer section 300 comprises a transmitter section 330 for transmitting a packet onto the network in response to a transmission request from the application 400 or an order control section 310, the order control section 310 for making control for maintaining order consistency of multicast data in a given group, and a receiver section 320 for receiving a packet from the network, and delivering that packet to the application 400 or order control section 310.

Figure 17:
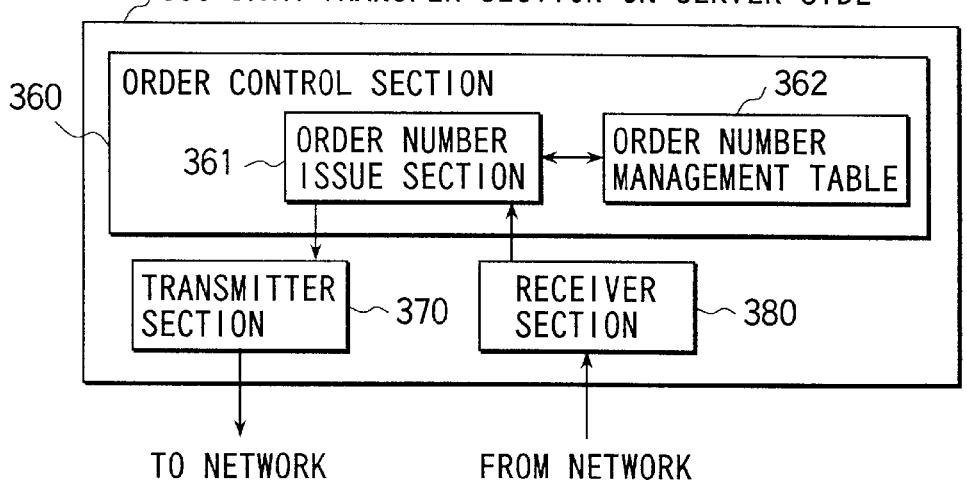
FIG. 17 is a block diagram showing an example of the arrangement of a server terminal according to the second embodiment of the present invention.

As shown in FIG. 17, a data transfer section 350 of the server terminal comprises a transmitter section 370 for transmitting a packet onto the network in response to a transmission request from an order control section 360, the order control section 360 for issuing an order number used to maintain the consistency of order numbers in a given group in response to a number issue request packet received from each client terminal, and a receiver section 380 for receiving a packet from the network, and delivering that packet to the order control section 360.

As in the second embodiment, the functions of the application 400 and data transfer sections 300 and 350 shown in FIGS. 16 and 17 are implemented by loading a storage medium (e.g., a floppy disk) which records a program for making the personal computer implement these functions into a floppy disk drive of the personal computer, and reading and executing the program recorded on the floppy disk by the personal computer (or its CPU).

The processes in the terminals upon exchanging one multicast data among the terminals in the group shown in FIG. 7 will be explained below. Note that one of the plurality of terminals in the group shown in FIG. 7 is a server terminal, and other terminals are client terminals.

Figure 18:
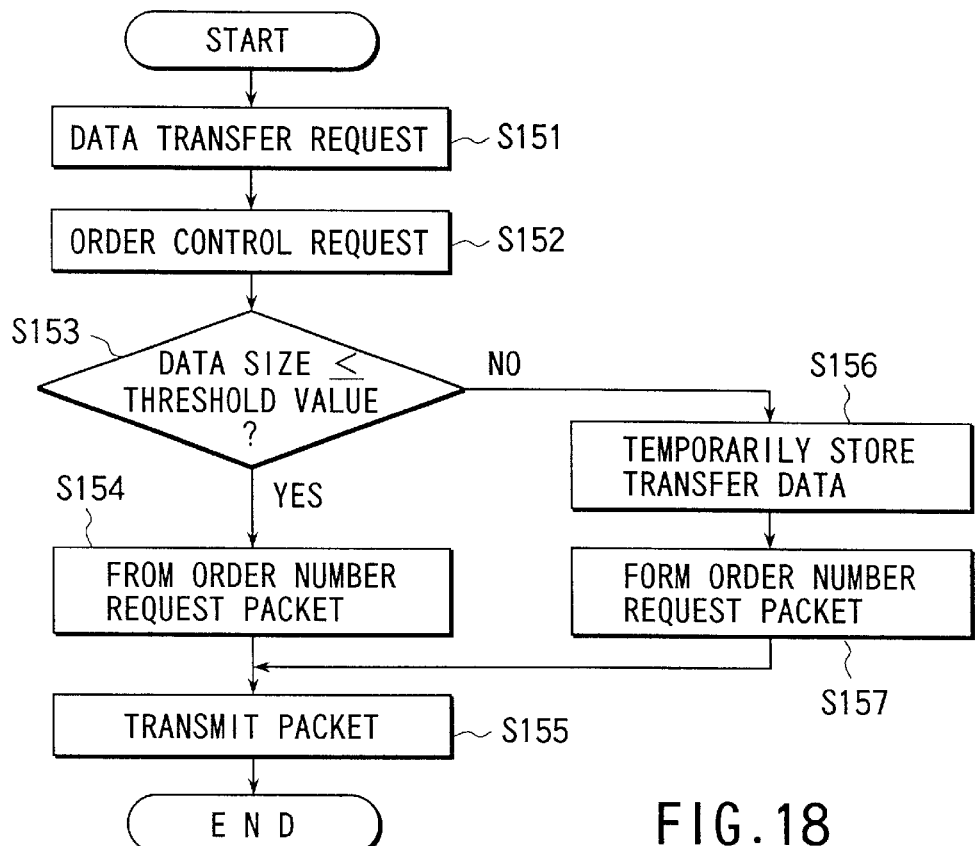
FIG. 18 is a flow chart showing the processes of the client terminal upon transmitting a packet.

The processes of the client terminal upon transmitting a packet will be described first with reference to the flow chart shown in FIG. 18.

Upon receiving a multicast data transmission request from the application 400 (step S151), a transmission request acknowledge section 331 in the client terminal issues an order control request to an order control method discrimination section 331 (step S152). The order control method discrimination section 331 checks the length of multicast data to be transmitted, which is passed from the application 400 (step S153). If the length is equal to or smaller than a predetermined threshold value, the section 331 issues an order control request to a first order number control section 312; otherwise, it issues an order control request to a second order number control section 313. The threshold value for the data length is the same as that described in the first embodiment.

Upon receiving an order number issue request, the first order number control section 312 forms an order number issue request packet with the format shown in FIG. 12. That is, the section 312 writes the identifier of the server terminal in destination field 3, the identifier of the self terminal in source field 3, "NULL" in order number field 4, multicast data in payload 6, and the size of the multicast data in data size field 5 (step S154).

After that, the formed packet is output onto the network via the transmission request acknowledge section 331 and a transmission data construction section 332 (step S155).

On the other hand, upon receiving an order number issue request in step S153, the second order number control section 313 temporarily saves multicast data in a transmission data queue 314 (step S156), and forms an order number issue request packet with the format shown in FIG. 13. That is, the section 313 writes the identifier of the server terminal in destination field 3, the identifier of the self terminal in source field 3, "NULL" in order number field 4, and "NULL" in data size field 5 (step S157).

Next, the formed packet is output onto the network via the transmission request acknowledge section 331 and transmission data construction section 332 (step S155).

Figure 19:
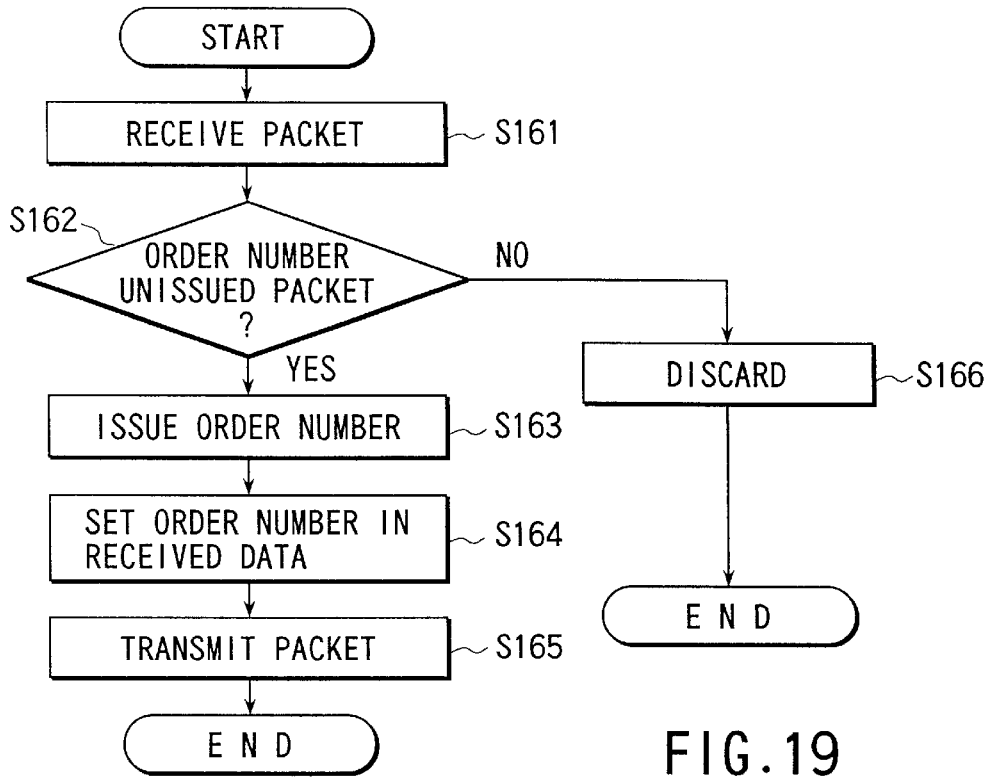
FIG. 19 is a flow chart showing the processes of the server terminal which receives an order number issue request packet.

The processes of the server terminal for receiving the order number issue request packet will be described below with reference to the flow chart shown in FIG. 19.

Upon receiving a packet from the network (step S161), the receiver section 380 in the server terminal checks order number field 4 of the received packet to see if the order number has already been issued, i.e., if the received packet is an order number issue request packet (step S162). If "NULL" is written in order number field 4, since the received packet is an order number issue request packet, the section 380 issues an order number issue request to an order number issue section 361 (step S163). If the order number has already been written in that received packet, the server terminal discards the received packet (step S166).

Upon receiving the order number issue request, the order number issue section 361 issues an order number with reference to an order number management table 362 (step S163), writes the issued order number in order number field 4 of the received packet (step S164), and multicasts the packet onto the network via the transmitter section 370 (step S165).

The processes of the client terminal which has received an order number information packet issued in response to the order number issue request will be explained below with reference to the flow chart shown in FIG. 20.

Upon receiving a packet from the network by the receiver section 320 in the client terminal (step S171), a receive data analysis section 323 checks destination field 2 of the received packet, and discards a packet other than the one addressed to the self terminal (including a multicast packet) (steps S172 and S180). If the received packet is addressed to the self terminal, the section 323 further checks order number field 4 to see if the order number has already been issued (step S173). If the order number is written, the section 232 checks data size field 5 to see if the packet has payload 6 (step S174).

If the received packet has the order number and payload 6, the section 323 stores at least the order number and multicast data written in payload 6 in a receive data queue 322 (step S178), and informs a receive data control section 321 of reception of the multicast data (step S179). When the receive data control section 321 is informed of reception of the multicast data, the multicast data stored in the receive data queue 322 is passed to the application in the order of order numbers.

On the other hand, if the received packet has only the order number, since that received packet is a packet for informing of the order number, which is issued in response to the order number issue request issued in accordance with the second order number issue procedure, the section 323 passes that packet to the second order number control section 313. As in the second embodiment, the second order number control section 313 extracts multicast data from the transmission data queue 314 (step S175), and forms a packet with the format shown in FIG. 12 by writing that data in payload 6, the informed order number in order number field 4 (step S176), a group identifier in destination field 2, and the like. Then, the section 313 outputs the packet onto the network via the transmission request acknowledge section 331 and transmission data construction section 332 (step S177).

By executing the aforementioned control among the terminals in the group, multicast data can be efficiently transferred while maintaining order consistency in the group.

The fourth embodiment of the present invention will be described below with reference to FIGS. 21 and 22. An order number issue request packet output from server and client terminals of the fourth embodiment has the format shown in, e.g., FIG. 21.

Figure 21:
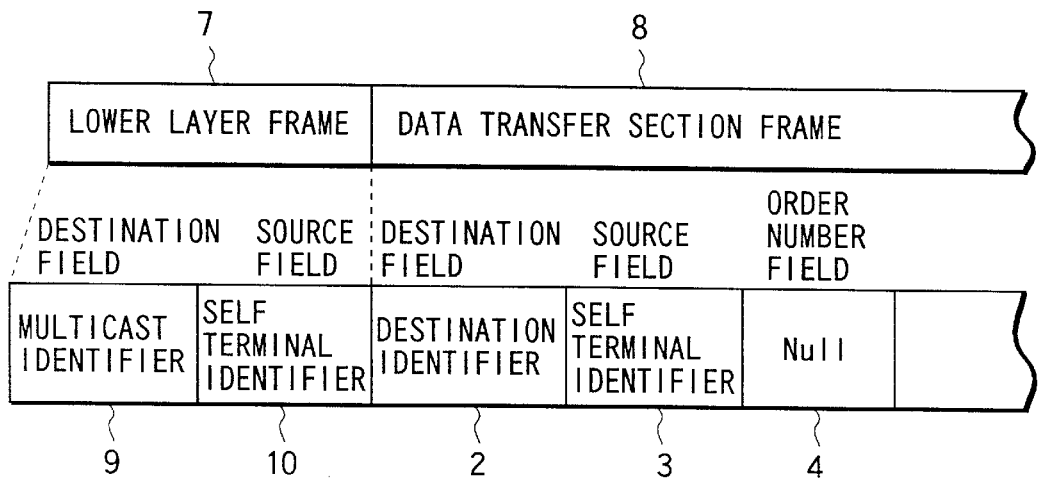
FIG. 21 shows an example of the format including a lower-layer frame of an order number issue request packet according to the third embodiment of the present invention.
Figure 22:
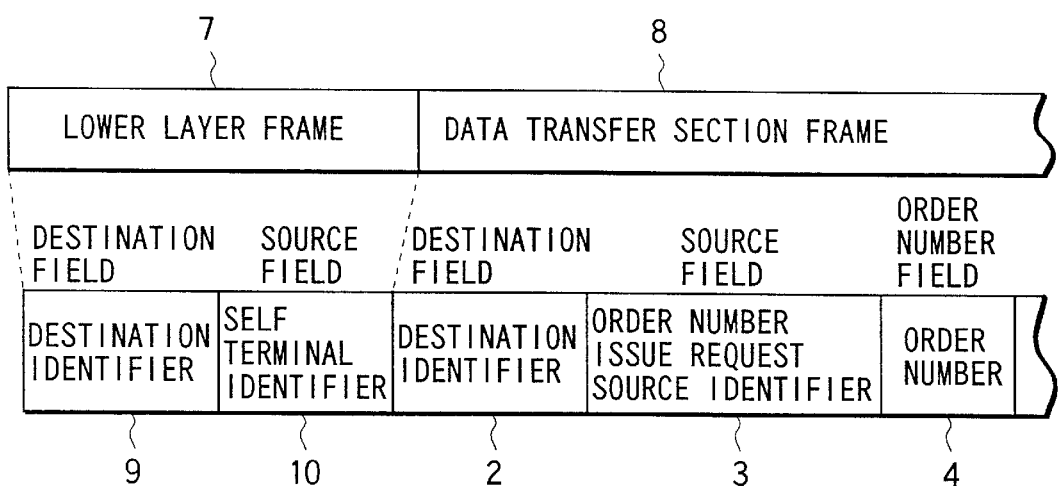
FIG. 22 shows an example of the format of a packet, for informing an order number, which has been issued by a server terminal upon receiving the order number issue request packet with the format shown in FIG. 21.

A first or second order number control section forms data transfer section frame 8 shown in FIG. 21. More specifically, each section writes a destination identifier of data requested from an application 400 in destination field 2, a self terminal identifier in source field 3, and "NULL" in order number field 4.

Data transfer section frame 8 formed by the first or second order number control section is further appended with an identifier indicating multicast as destinations to be informed to a lower layer, and the self terminal identifier as the packet source, as shown in FIG. 21, when it is output onto the network via the lower layer.

Upon receiving the order number issue request shown in FIG. 21, an order number issue terminal or server issues an order number. The issued order number is written in order number field 4, and the identifier of the order number issue request source is kept stored in source field 3 in place of the identifier of the order number issue terminal or server, as shown in FIG. 22.

According to this embodiment, the order number issue request source terminal need not detect the identifier of the order number issue terminal upon forming an order number issue request packet. When multicast data is transmitted via the order number issue terminal to issue an order number, if the destination address is merely appended to a packet header as in a conventional system, it appears to the receiving terminal that all such data have been received from the order number issue terminal. However, according to this embodiment, even when the first order number issue procedure shown in FIG. 14 is used, the receiving terminal can be informed of the true source terminal of multicast data without any overhead (e.g., without multicasting any packet for informing the multicast data source).

The fifth embodiment of the present invention will be described below with reference to FIGS. 23 to 29. In this embodiment, each terminal for transmitting a multicast packet issues an order number by itself, and appends it to a packet. Upon receiving a packet which includes an order number but does not include any payload 6, each terminal in a multicast group temporarily stores that packet as a pseudo packet in a receive data queue 222. When a terminal, which has received an order number issued by an order number issue terminal, has intentionally withdrew from the multicast group by the user of that terminal or cannot communicate due to some cause (e.g., the terminal has failed), and a multicast packet to be transmitted from that terminal cannot be received (or is to be ignored) by another terminal in the multicast group, other terminals in the multicast group are controlled to skip that order number. As a result, terminals in the multicast group other than the terminal which has withdrew from the group or has failed (to be referred to as a failed terminal hereinafter) can smoothly correct the receive order of multicast packets, thus implementing efficient multicast communications.

As a method of detecting withdrawal of an arbitrary terminal from the multicast group or a failure such as a communication failure, a method in which the respective terminals in a multicast group check the presence absence of response signals transmitted from the individual terminals (subsidiary terminals) in response to a confirmation signal output from an arbitrary terminal (master terminal) in the group at predetermined time intervals, a method in which the master terminal checks the presence/absence of response signals output from the subsidiary terminals at given time intervals, a method in which a terminal that quits data transmission in response to the user instruction transmits a multicast packet indicating that message to the respective terminals in the multicast group, and the like, are available. However, the present invention is not limited to use of any specific detection method.

Figure 23:
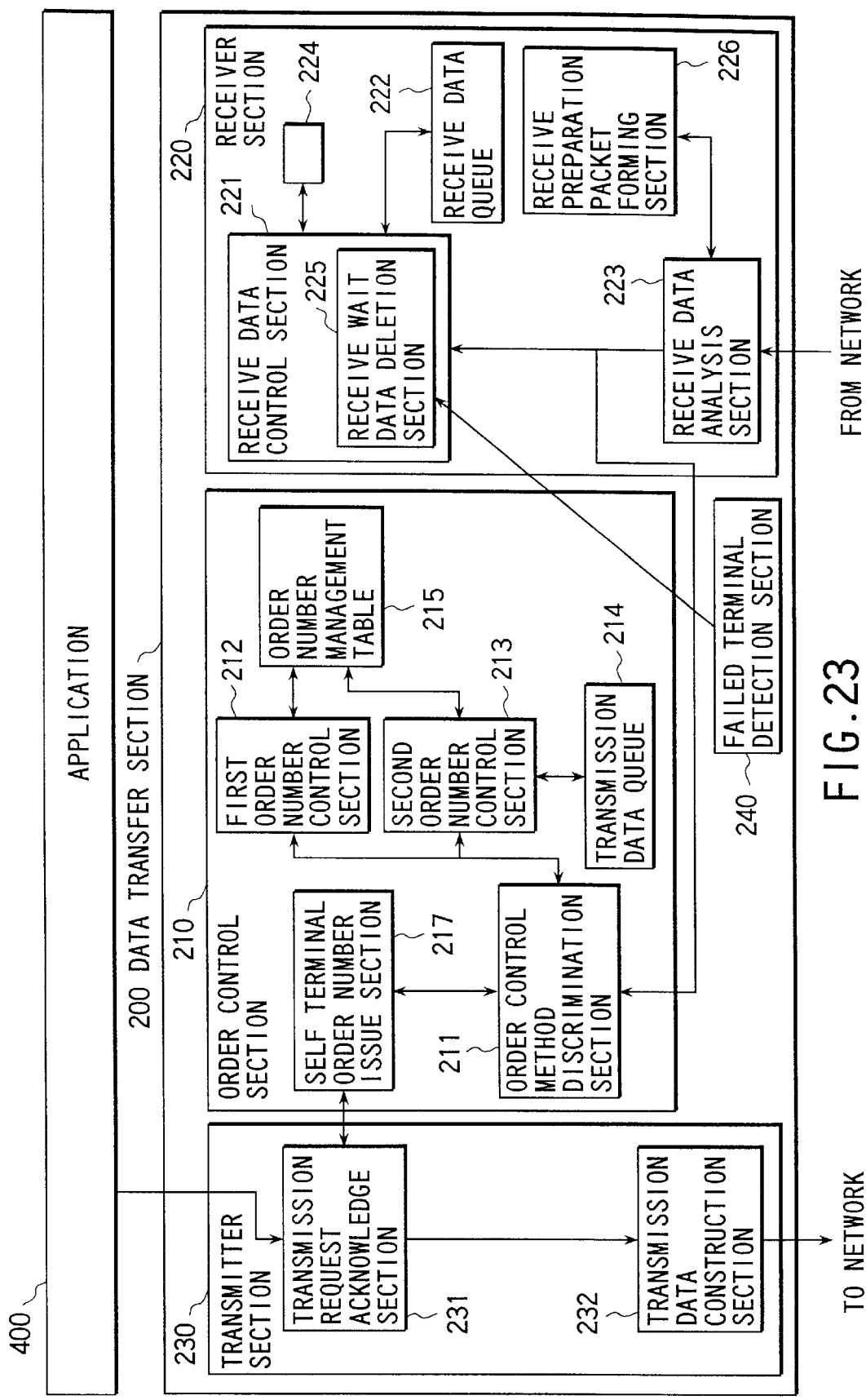
FIG. 23 is a block diagram showing an example of the arrangement of a terminal according to the fourth embodiment of the present invention.

FIG. 23 shows the arrangement of a terminal that constitutes the multicast group shown in FIG. 7 via the network. The same reference numerals in FIG. 23 denote the same parts as those in FIG. 8, and only different sections will be explained. More specifically, the terminal shown in FIG. 23 further comprises a failed terminal detection section 240, a self terminal order number issue section 217 in the order control section 210, and a receive preparation packet forming section 226 and receive standby data deletion section 225 in the receiver section 220.

Figure 24:
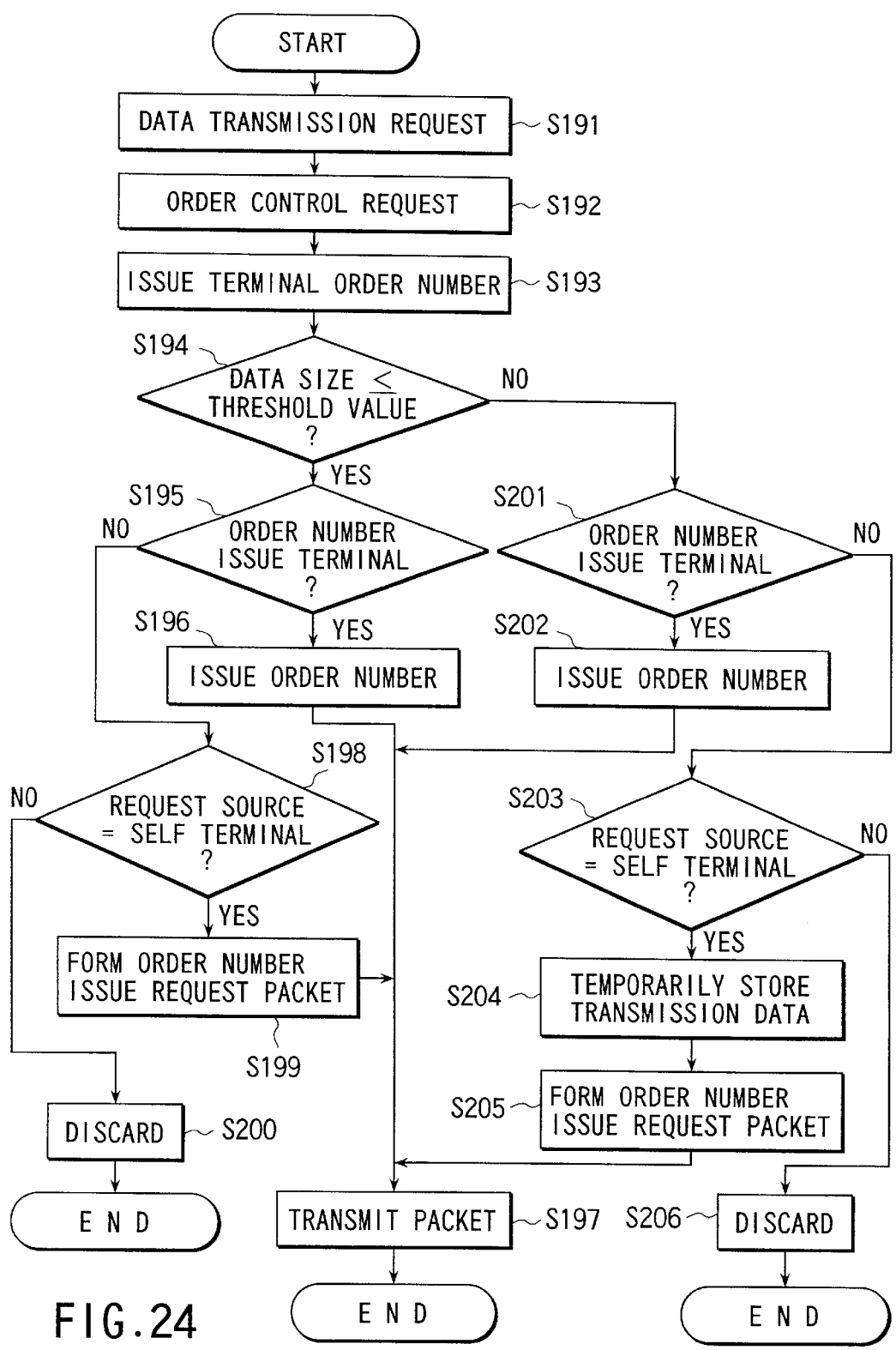
FIG. 24 is a flow chart showing the processes of the terminal upon transmitting a packet.

The processes of the terminal upon transmitting a packet will be explained below with reference to the flow chart shown in FIG. 24. Unlike in the second embodiment (FIG. 9), the terminal A, B or C issues an order number for itself in response to a data transmission request from the application 400.

Upon receiving a multicast data transmission request from the application 400 (step S191), the transmission request acknowledge section 231 in the transmitter section 230 issues a terminal order number issue request to the self terminal order number issue section 217 (step S192). The self terminal order number issue section 217 issues a terminal order number for each multicast data to be transmitted from the self terminal (step S193), and passes the issued terminal order number to the order control method discrimination section 211.

The order control method discrimination section 211 checks the length of the multicast data to be transmitted, which was passed from the application 400, and if the length is equal to or smaller than a predetermined threshold value, the section 211 issues an order control request to the first order number control section 212; otherwise, the section 211 issues an order control request to the second order number control section 213 (step S194).

The threshold value for the data length is used to determine one of the aforementioned first and second order number issue procedures upon transferring multicast data.

Figure 9:
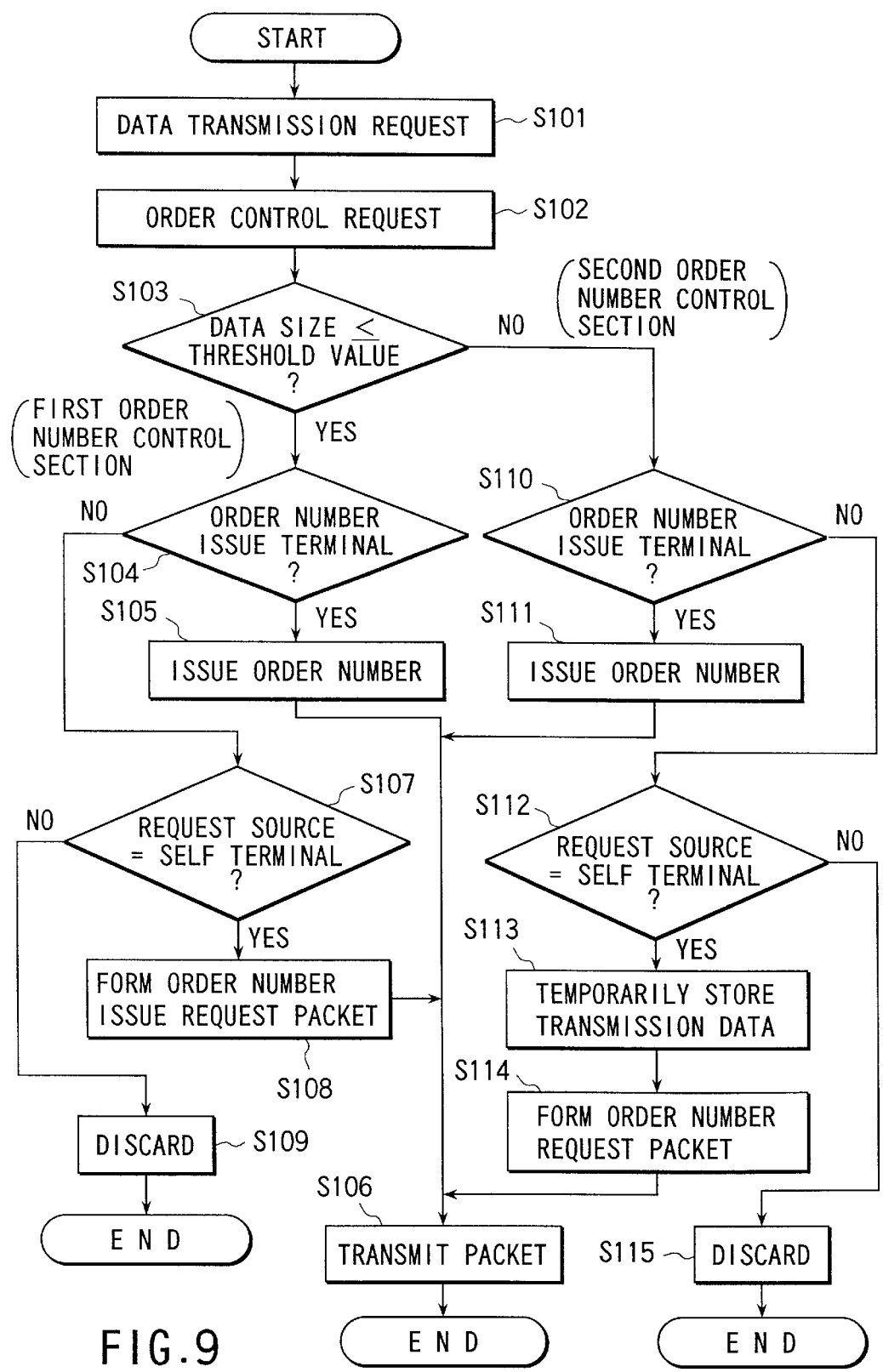
FIG. 9 is a flow chart showing the processes of the terminal upon transmitting a packet.

The subsequence processes (steps S196 to S206) are the same as those in FIG. 9. However, in an order number issue request packet formed in step S199 or S205, the terminal order number issued in step S193 is written in source order number field 12, as shown in FIG. 28.

Figure 10:
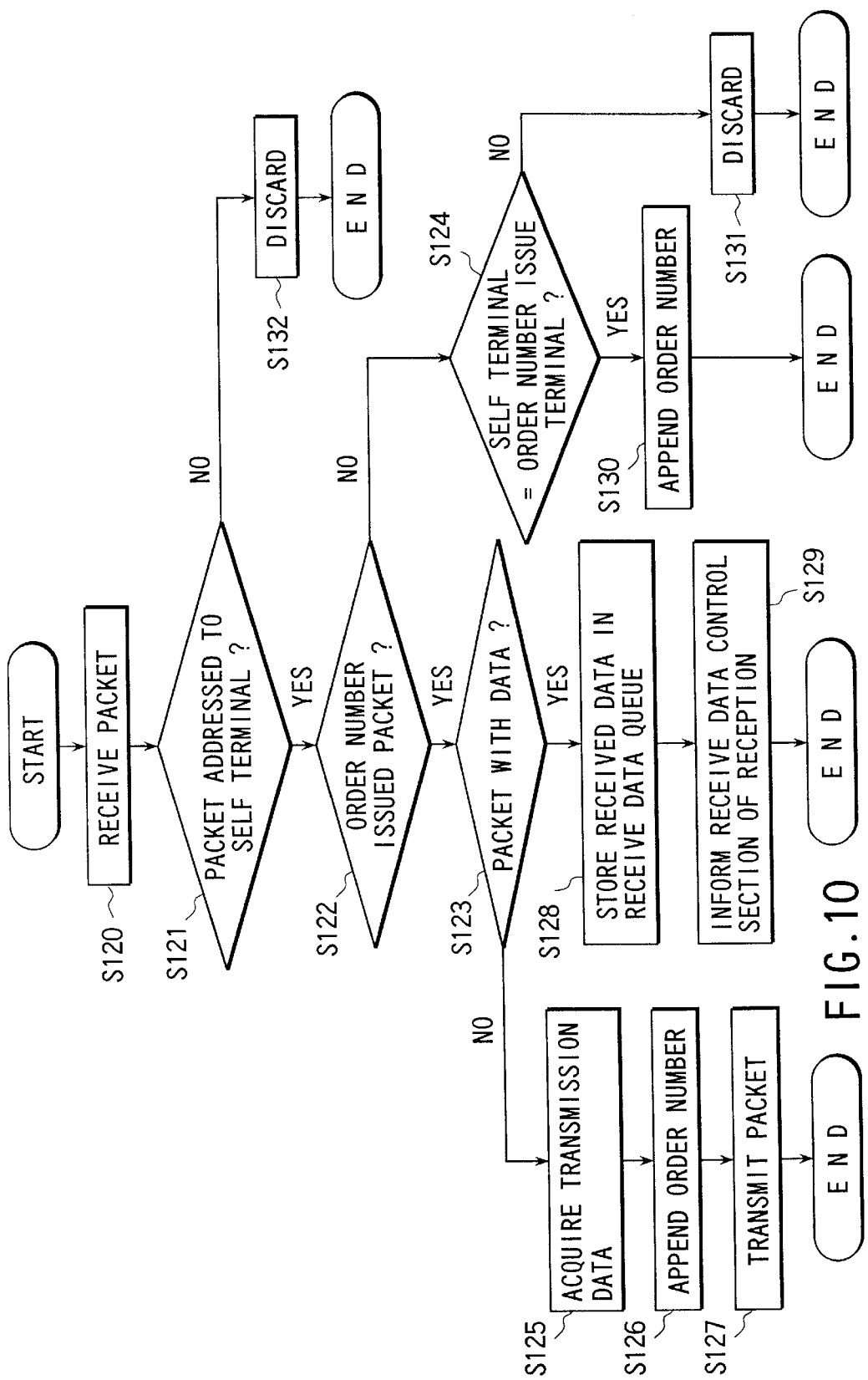
FIG. 10 is a flow chart showing the processes of the terminal upon receiving a packet.
Figure 28:
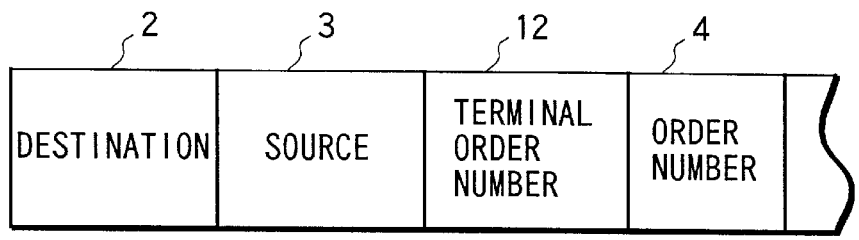
FIG. 28 shows an example of the format of an order number issue request packet according to the fourth embodiment.

Upon receiving the order number issue request packet shown in FIG. 28 from terminal 1, an order number issue terminal issues an order number in the same manner as in FIG. 10, and outputs the packet onto the network.

Figure 25:
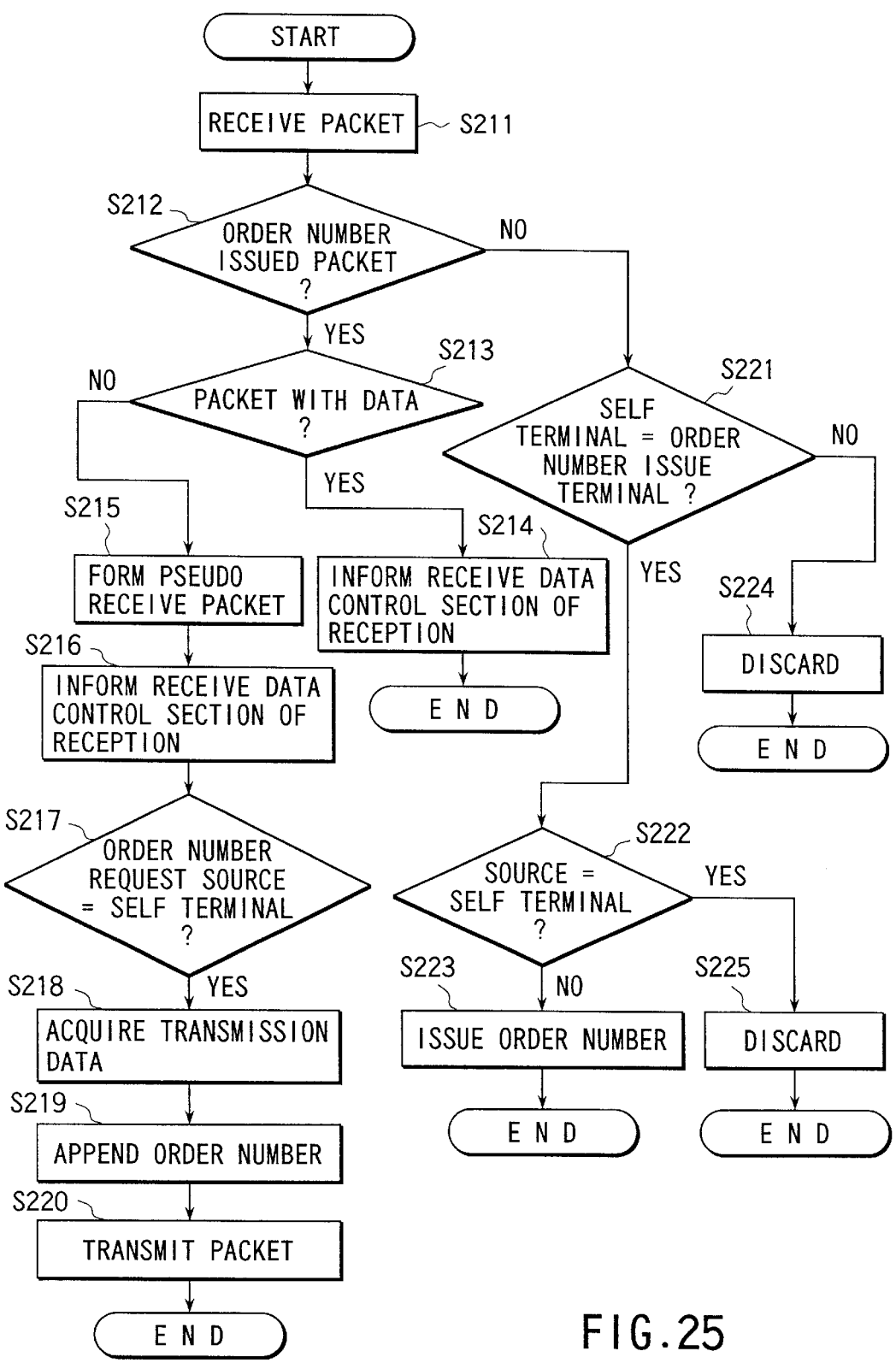
FIG. 25 is a flow chart showing the processes of the terminal upon receiving a packet.

The processes of terminal A, B or C which receives a packet will be explained below with reference to the flow chart shown in FIG. 25.

Upon receiving a packet from the network (step S211), the receive data analysis section 223 of the receive section 220 in each terminal A, B or C checks order number field 4 of the received packet to see if the order number has already been issued (step S212). If the order number has already been issued, the section 223 checks data size field 5 and payload 6 of the received packet to see if multicast data is appended (step S213). If the data is appended, the section 223 passes the received packet to the receive data control section 221, thus informing it of reception of the multicast data (step S214).

Figure 29:
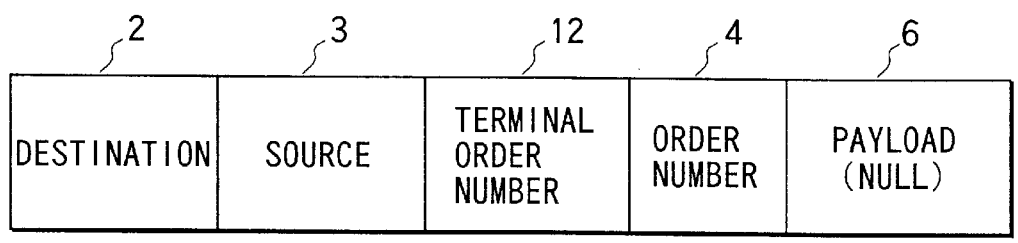
FIG. 29 shows an example of the format of a pseudo packet.

If it is determined in step S213 that the received packet is an order number informing packet which has no payload, the receive preparation packet forming section 226 forms a pseudo receive packet shown in FIG. 29 on the basis of the source, the terminal order number appended by the source, and the order number appended by the order number issue terminal (step S215).

As shown in FIG. 29, the pseudo receive packet has destination field 2, source field 3, terminal order number field 12 in which the order number issued by the source terminal of the received packet is written, order number field 4, and payload 6. In this case, "NULL" is written in payload 6.

The receive data analysis section 223 passes the pseudo receive packet to the receive data control section 221, thus informing it of reception of the multicast data (step S216).

Furthermore, if the received packet is an order number informing packet which has no payload, it is checked if the order number request source is the self terminal (step S217). If the self terminal is the order number request source, the receive data analysis section 223 passes the received packet to the order control method discrimination section 211. Upon receiving the order number written in the received packet, the order control method discrimination section 211 passes it to the second order number control section 213, extracts multicast data from the transmission data queue 214 (step S218), and forms a packet with the format shown in, e.g., FIG. 28, by writing that data in payload 6, the received order number in order number field 4 (step S219), a group identifier in destination field 2, and the like. Then, the section 223 outputs the packet onto the network via the transmission request acknowledge section 231 and transmission data construction section 232 (step S220).

If the order number has not been issued yet (e.g., no order number is written in order number field 4 or "NULL" is written), the self terminal is the order number issue terminal, and the source of the received packet is not the self terminal (steps S221 and S222), an order number issue request is sent to the order control method discrimination section 211 (step S223). If the order number has not been issued yet, and the self terminal is not the order number issue terminal, the received packet is discarded (step S224). Also, if the order number has not been issued yet and the self terminal is the order number issue terminal but is not the source of the received packet, the packet is discarded (step S225).

In step S223, the order control method discrimination section 211 issues an order control request to the first order number control section 212 when the received packet has payload 6 (i.e., the packet has the format shown in FIG. 12), or to the second order number control section 213 when the packet has no payload (e.g., the packet has the format shown in FIG. 13). The first or second order number control section 212 or 213 issues an order number with reference to the order number management table 215, and writes the issued order number in order number field 4, and also a group identifier in the group in destination field 2 in case of the format shown in FIG. 12. The section 212 or 213 then outputs the packet onto the network via the transmission request acknowledge section 231 and transmission data construction section 232.

Figure 26:
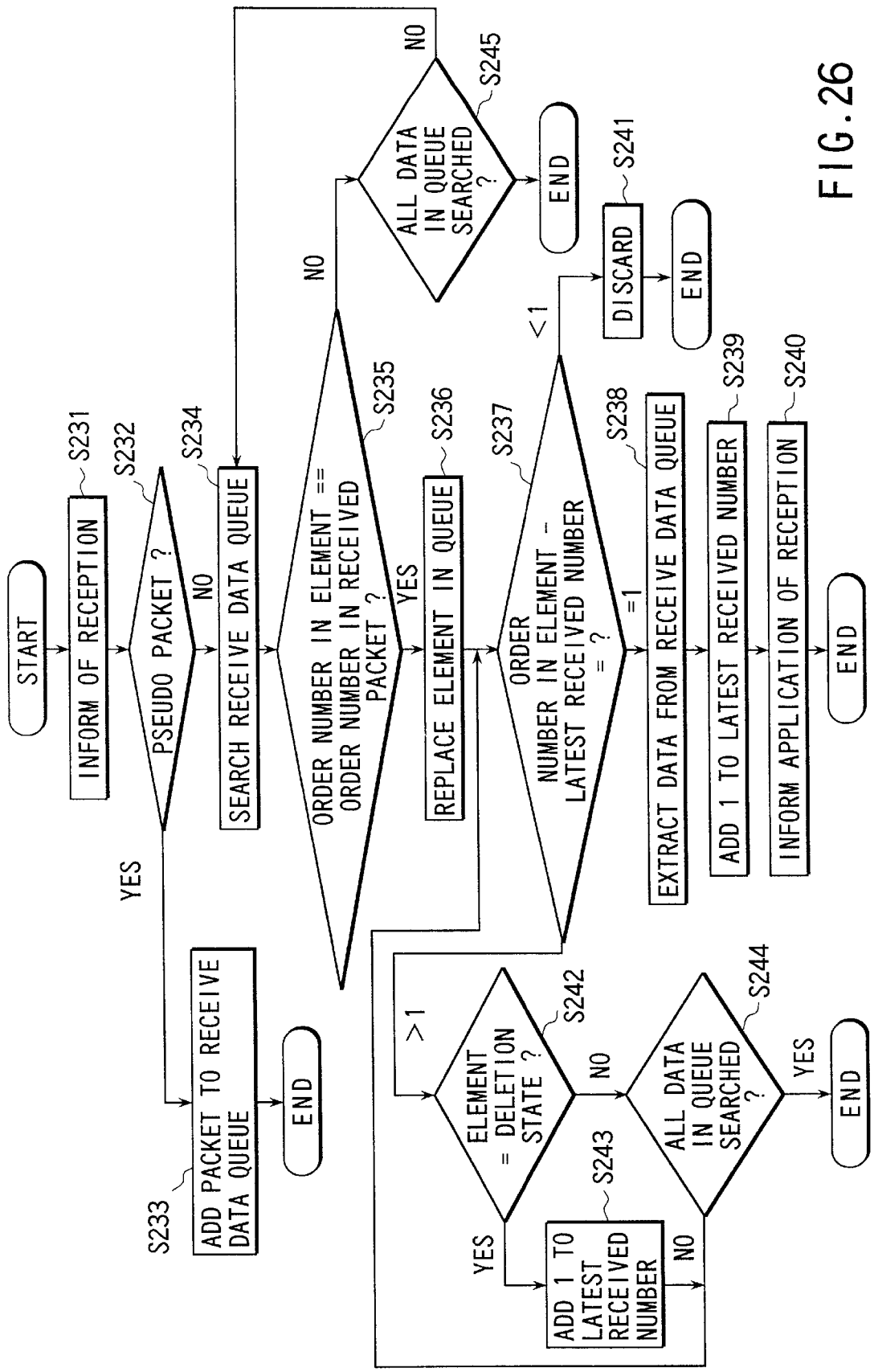
FIG. 26 is a flow chart showing the processes when a receive data control section is informed of reception of multicast data.
Figure 27:
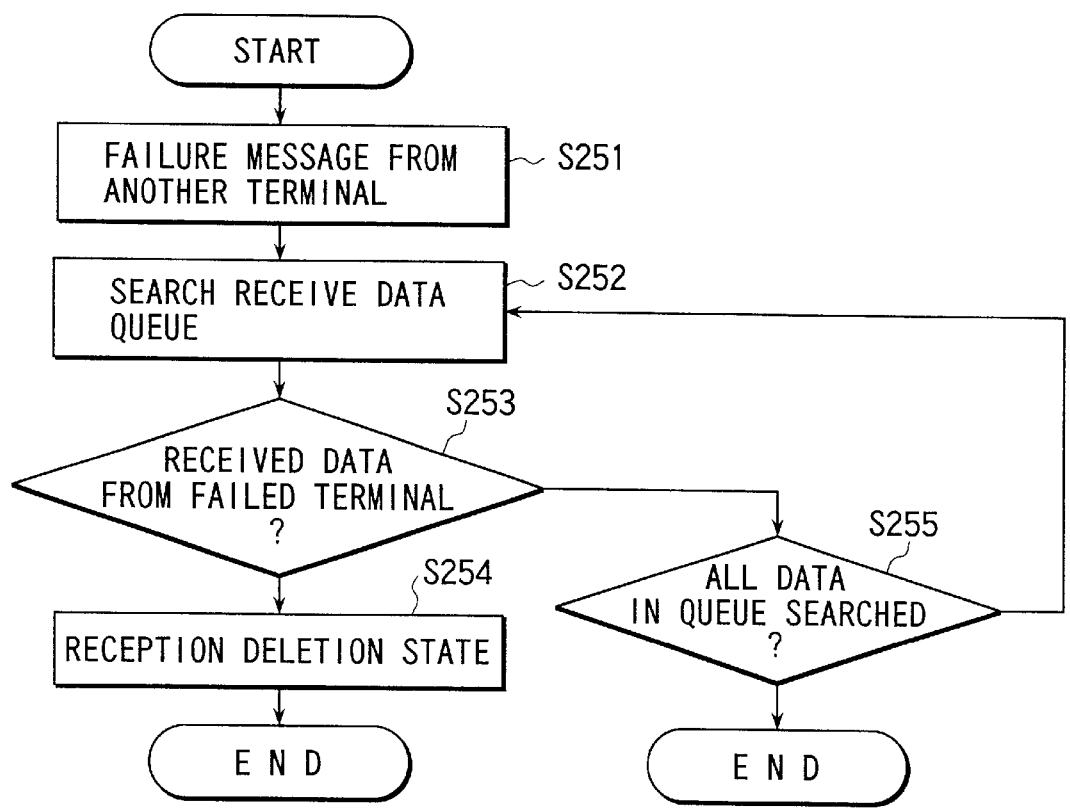
FIG. 27 is a flow chart showing the processes of the terminal when a failed terminal detection section has detected a failed terminal.

The processes executed after the receive data control section 221 is informed of reception of the multicast data in step S214 or S216 will be described below with reference to the flow chart shown in FIG. 26.

If the receive data control section 221 is informed of reception of the multicast data (step S231), the section 221 checks if the received packet is a pseudo packet (step S232). If the received packet is a pseudo packet, the section 221 stores the packet in the receive data queue 222 (step S233). In this case, an area corresponding to the data size of payload 6 is assured in the receive data queue 222 in correspondence with the order number and terminal order number contained in the pseudo packet. If the received packet is not a pseudo packet, the receive data control section 221 searches the order numbers appended to multicast data stored in the receive data queue 222 (step S234). If the section 221 finds an order number equal to that in the received packet from those contained in multicast data in the receive data queue 222 (step S235), the section 221 stores the multicast data written in payload 6 in the received packet in correspondence with the found order number of the receive data queue 222. Otherwise, the section 221 rewrites the corresponding fields of the list 222 by the received packet (step S236).

Furthermore, the receive data control section 221 searches the order numbers written in multicast data stored in the receive data queue 222, and compares the differences between the order numbers of multicast data in the receive data queue 222 and the latest received number (the order number appended to the latest data which has been passed to the application 400) (step S237). If the section 221 finds an order number corresponding to the difference="1" in the receive data queue 222, it extracts multicast data of that order number (step S238). That is, the section 221 extracts multicast data appended with the order number next to the latest received number from the receive data queue 222. The section 221 then updates the latest received number by adding "1" thereto (step S239). The extracted multicast data is passed to the application 400 (step S240).

If the receive data queue 222 stores multicast data with order numbers equal to or smaller than the latest received number, since these data have already been passed to the application 400, they may be deleted from the receive data queue 222 (step S241).

Upon detecting a failed terminal by a certain terminal in the multicast group, the master terminal (which may be any terminal in the multicast group but is preferably the order number issue terminal), which has detected that message by the failed terminal detection section 240, multicasts a failure informing packet which contains the identifier of the failed terminal to be removed from the multicast group and the terminal order number to be ignored (skipped), or a terminal which is about to withdraw from the multicast group multicasts a failure informing packet that contains the identifier of the self terminal and the terminal order number to be ignored (skipped) to the respective terminals in the multicast group. Upon receiving this message (step S251 in FIG. 27), the receive wait data deletion section 225 of each terminal searches the receive data queue 222 for multicast data having the informed terminal identifier and terminal order number (steps S252 and S253), and sets the found data in a reception deletion state (step S254). For example, the section 225 writes flag information indicating a reception deletion state in the multicast data having the corresponding order number and terminal order number in the receive data queue 222, thereby setting that data in the reception deletion state.

If it is determined in step S237 that the receive data queue 222 stores only multicast data with order numbers which have differences larger than "1" from the latest received number, it is checked in ascending order of order number if that order number is set in the reception deletion state (step S242). If the extracted multicast data is set in the reception deletion state, "1" is added to the latest received number (step S243).

With this control, since the individual terminals in the multicast group are informed of the order number and source order number of multicast data (with an already issued order number) from a terminal to be deleted from the multicast group, and such data is set in the reception deletion state, even when multicast data is received from the terminal in question, data before the latest received number is discarded.

The sixth embodiment of the present invention will be described below with reference to FIGS. 30 to 36. In this embodiment, assume that one of terminals which build the network shown in FIG. 7 is a server terminal, and other terminals are client terminals.

Figure 30:
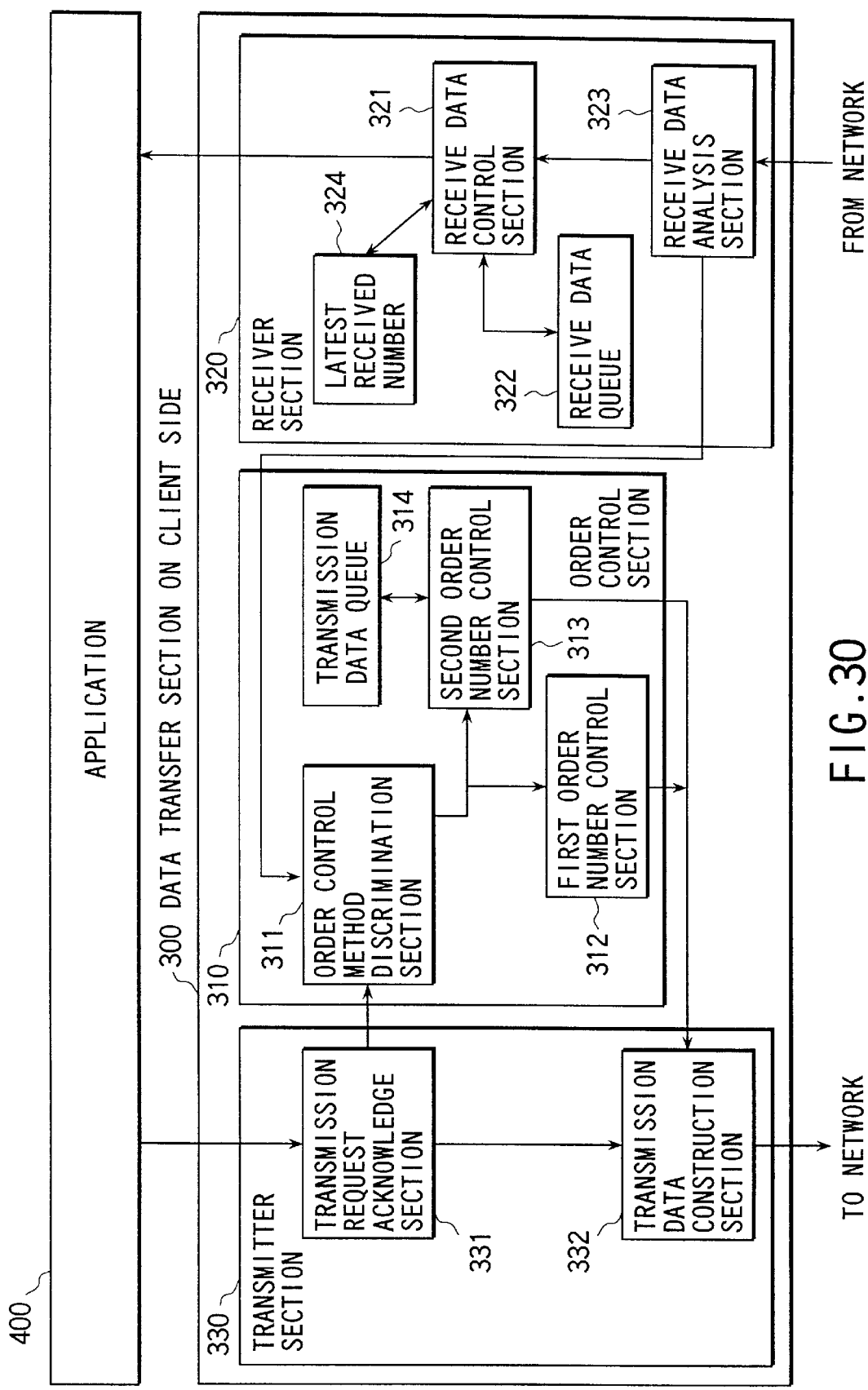
FIG. 30 is a block diagram showing an example of the arrangement of a client terminal of a terminal according to the fifth embodiment of the present invention.
Figure 31:
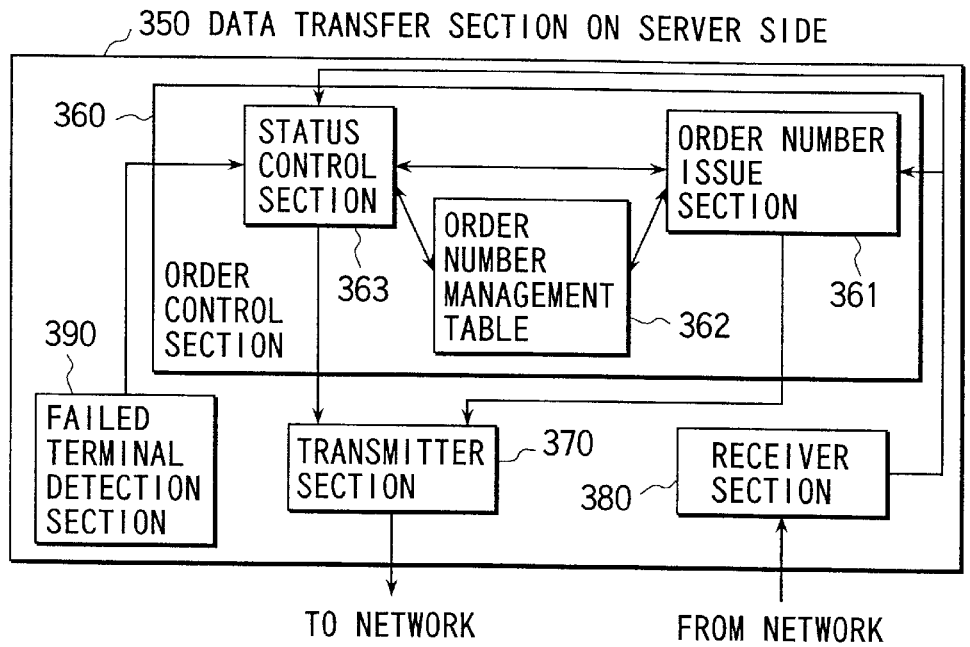
FIG. 31 is a block diagram showing an example of the arrangement of a server terminal according to the fifth embodiment of the present invention.

FIG. 30 shows an example of the arrangement of the client terminal, and FIG. 31 shows an example of the arrangement of the server terminal. Note that the arrangement of the client terminal shown in FIG. 30 is the same as that shown in FIG. 16. In the arrangement of the server terminal shown in FIG. 31, the same reference numerals denote the same parts as those in FIG. 17, and different sections will be explained below. More specifically, the server terminal shown in FIG. 31 also comprises a failed terminal detection section 390, and a status control section 363 for forming a multicast packet which instructs terminals in the multicast group to skip a multicast packet sent from a failed terminal when the failed terminal detection section 390 has detected the failed terminal.

Figure 32:
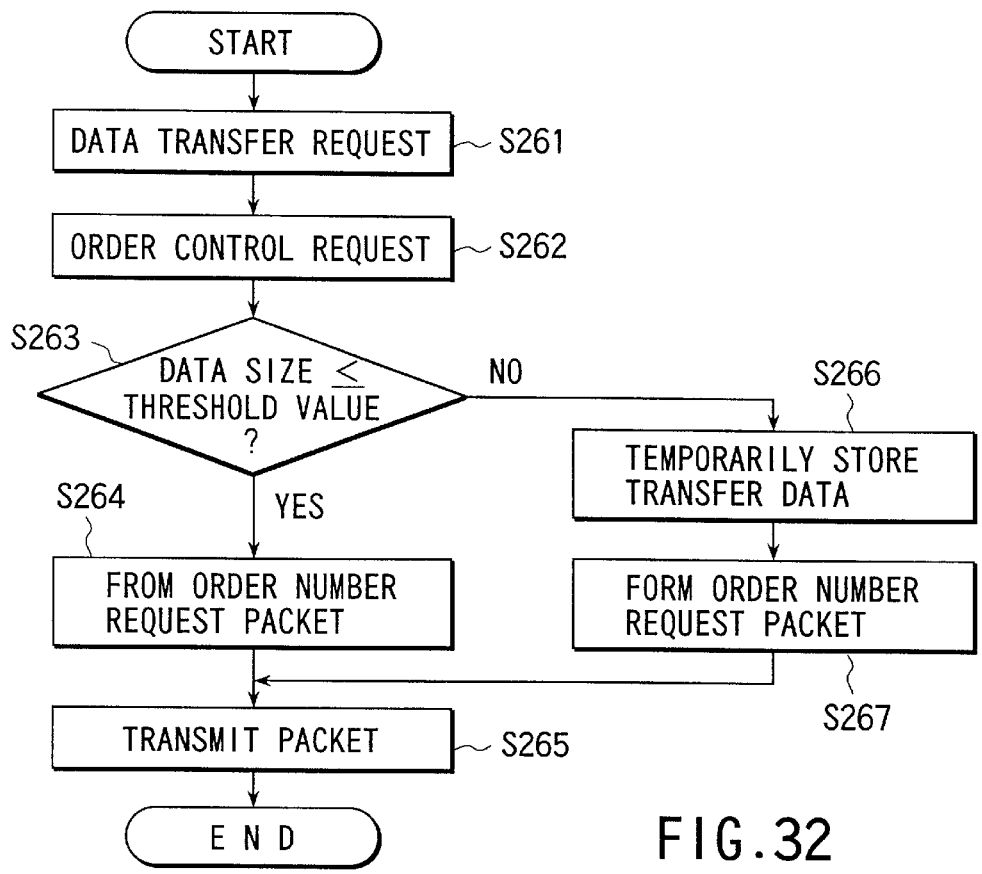
FIG. 32 is a flow chart showing the processes of the client terminal upon transmitting a packet.

FIG. 32 is a flow chart showing the processes of the client terminal upon transmitting a packet. Since FIG. 32 is the same as FIG. 18, a detailed description thereof will be omitted.

Figure 33:
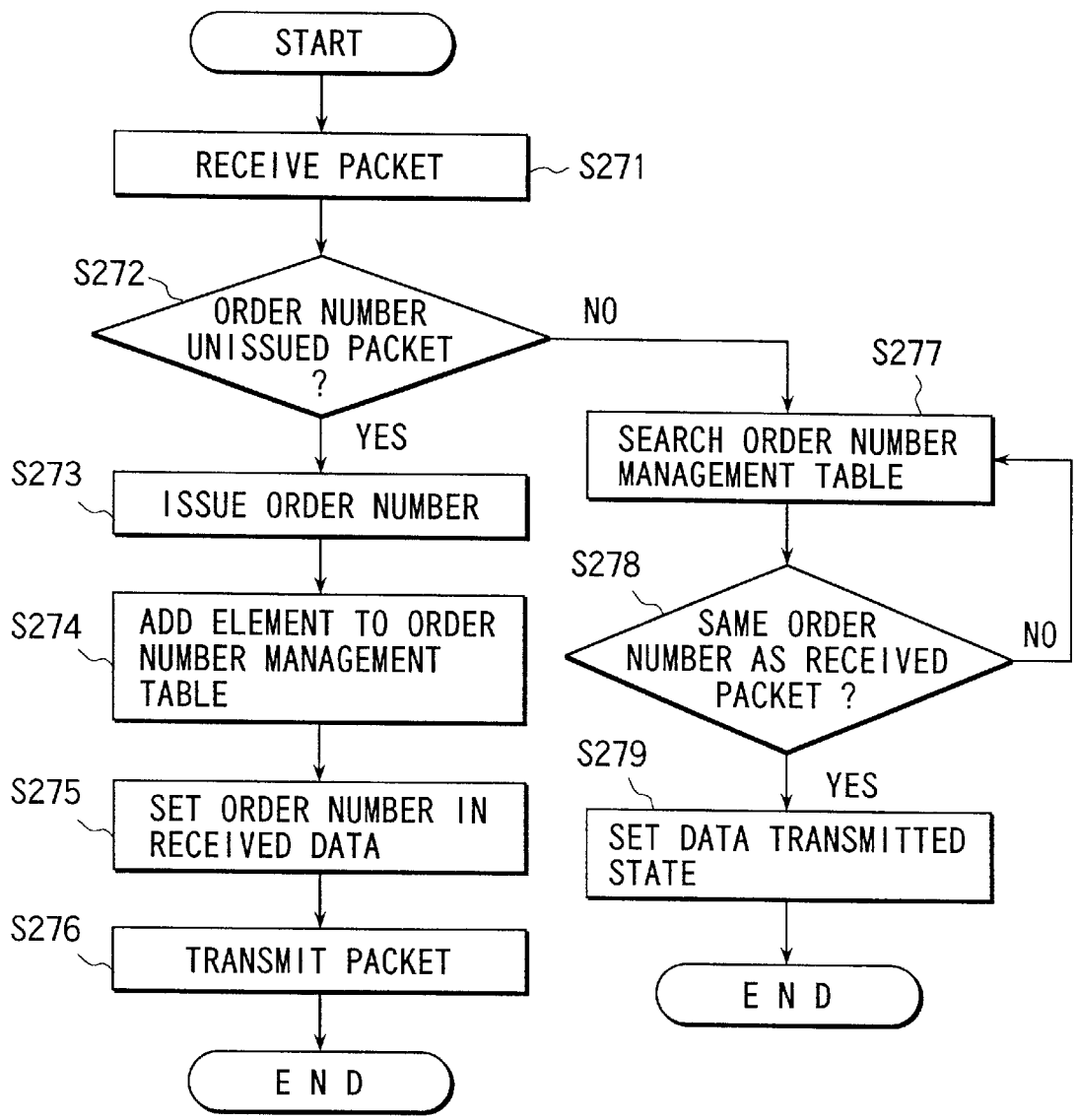
FIG. 33 is a flow chart showing the processes of the server terminal upon receiving an order number issue request packet.

The processes of the server terminal for receiving an order number issue request packet will be explained below with reference to the flow chart shown in FIG. 33.

Upon receiving a packet from the network (step S271), the receiver section 380 in the server terminal checks order number field 4 of the received packet to see if the order number has already been issued, i.e., if the received packet is an order number issue request packet (step S272). If "NULL" is written in order number field 4, since the received packet is an order number issue request packet, the section 380 issues an order number issue request to the order number issue section 361 (step S273).

Figures 35, 36:
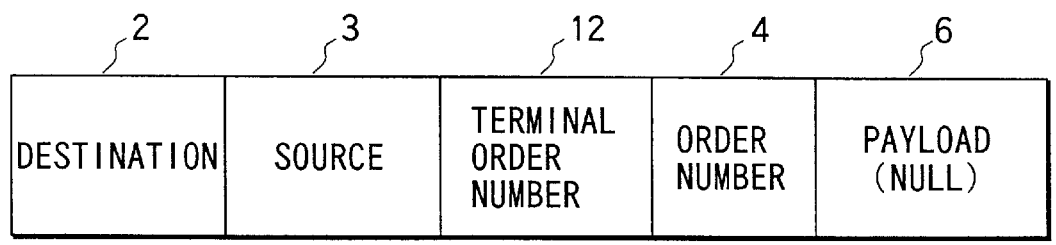
FIG. 35 shows a storage example of an order number management table of the server terminal.
FIG. 36 shows an example of the format of a receive skip packet.

Upon receiving the order number issue request, the order number issue section 361 issues an order number with reference to the order number management table 362 shown in, e.g., FIG. 35 (step S273), and writes the source identifier of the order number issue request packet in the order number management table 362 in correspondence with the issued order number (step S274). Furthermore, the section 361 issues a status check request of multicast data to the status control section 363. The status control section 363 checks the data size of the received packet to see if multicast data is appended. If multicast data is appended, the section 363 determines that the multicast data has already been transmitted; if the received packet is an order number issue request packet, the section 363 determines that the order number of that multicast data has already been issued, and returns "data transmitted" or "number issued" to the order number issue section 361. The order number issue section 361 writes the status check result from the status control section 363 in the order number management table 362 in correspondence with the order number (step S274).

The order number issue section 361 writes the order number in order number field 4 in the order number issue request packet (step S275), and outputs the packet onto the network via the transmitter section 370 (step S276).

On the other hand, if it is determined in step S272 that the order number has already been written in the received packet, the receiver section 380 passes the source identifier and order number of the received packet to the status control section 363. If the status control section 363 finds the same order number as the passed order number from those stored in the order number management table 362 (steps S277 and S278), it writes "data transmitted" in a column "status" corresponding to that order number in the order number management table 362 (step S279).

Figure 20:
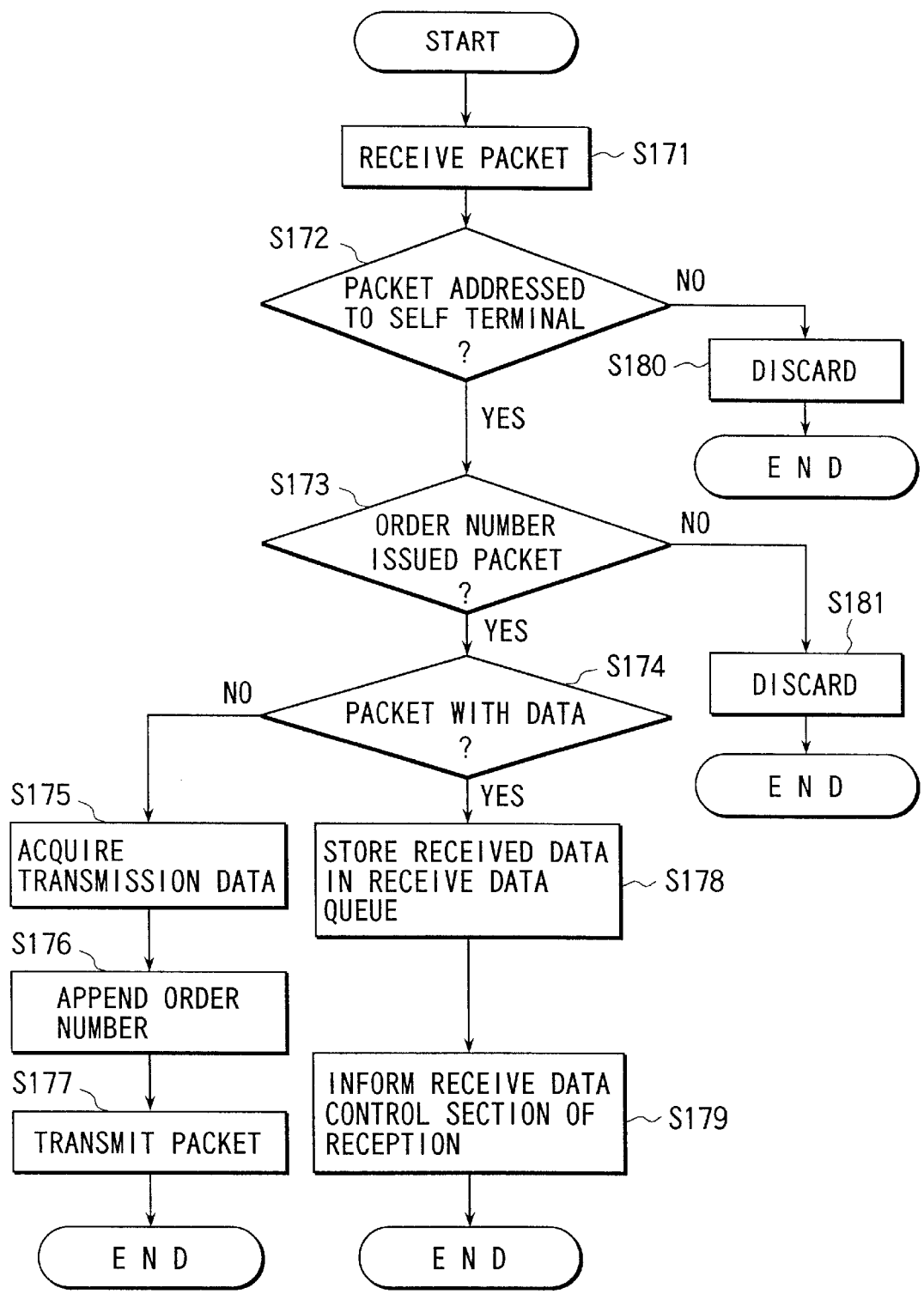
FIG. 20 is a flow chart showing the processes of the client terminal which has received a packet, for informing the order number, issued in response to the order number issue request.

In the client terminal that has received a packet for informing of the order number issued in response to the order number issue request, multicast data is passed to the application 400 in accordance with the order number appended to that multicast data in the same manner as in the second embodiment (see FIG. 20).

Figure 34:
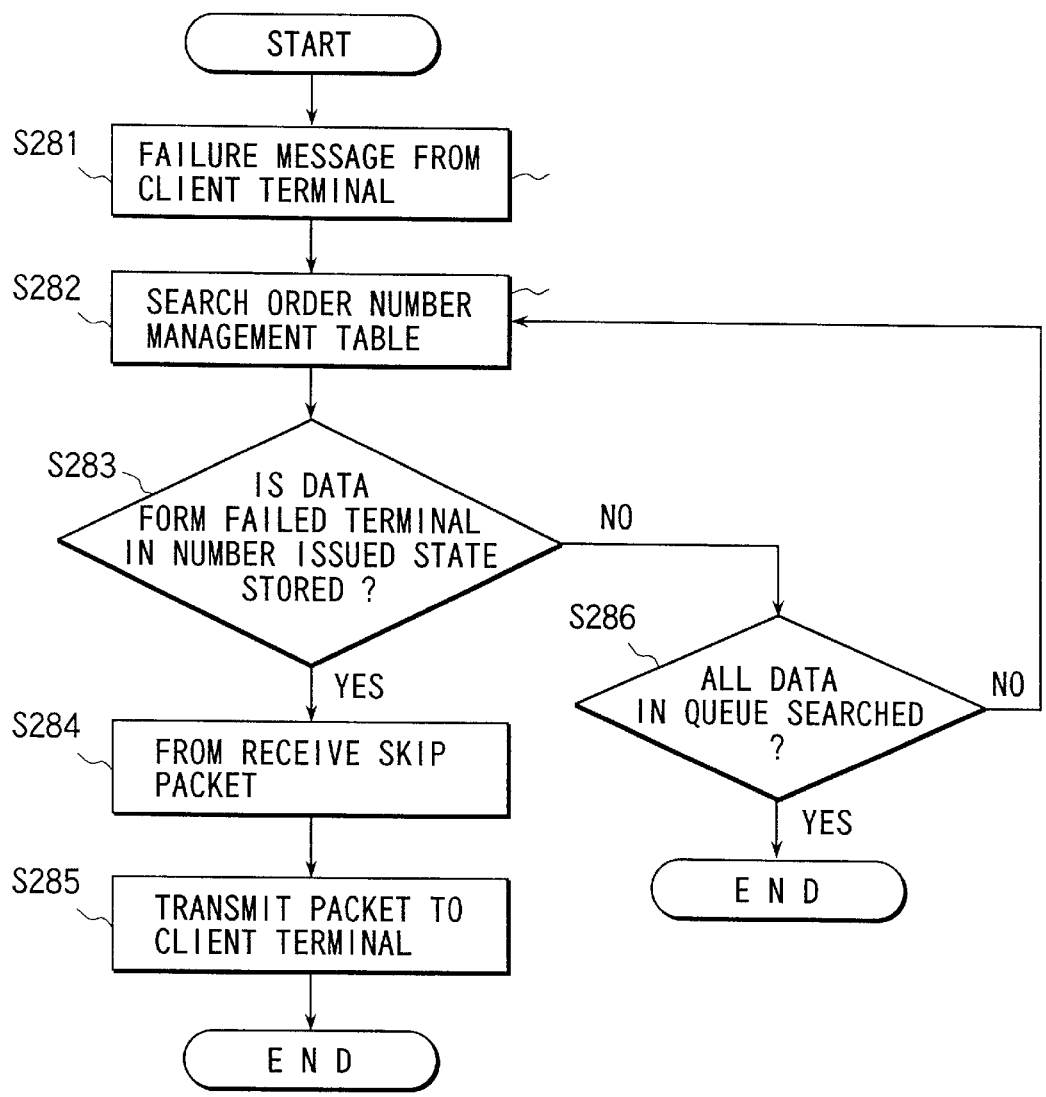
FIG. 34 is a flow chart showing the processes of the server terminal upon detecting the presence of a failed terminal among the terminals in a multicast group.

The processes of the server terminal executed when its failed terminal detection section 390 has detected the presence of a failed terminal from a certain terminal in the multicast group by detecting a failure of the client terminal or receiving a packet for informing of the end of operation of the data transfer section from the client terminal will be explained below with reference to the flow chart shown in FIG. 34.

Upon detecting a failed terminal, the failed terminal detection section 390 in the server terminal informs the status control section 363 of the terminal identifier of the failed terminal (step S281).

The status control section 363 searches the order number management table 362 (step S282). If the section 363 finds an order number with status "number issued" (step S283), it reads out the identifier of that failed terminal from the order number management table 362 and passes it to the transmitter section 370 to request the section 370 to form a reception skip packet. The transmitter section 370 forms a reception skip packet shown in, e.g., FIG. 36 (step S284), and multicasts the packet to all the client terminals in the multicast group (step S285).

In the client terminal, for example, the receive data control section 321 which has been informed of reception of multicast data checks if the received packet is a reception skip packet. If the receive data control section 321 checks, e.g., flag information included in payload 6 and used to check if the packet is a reception skip packet, and determines that the received packet is a reception skip packet, it executes the same processes as in, e.g., FIG. 11 with reference to the order number informed using the reception skip packet. In this embodiment, if multicast data extracted from the receive data queue 322 in step S144 in FIG. 11 is appended with the order number informed by the reception skip packet, that multicast packet is discarded, and only the latest received number 324 is updated.

Even when multicast data is delivered from the failed terminal after reception of the reception skip data, since the latest received number has been updated, that multicast data is discarded.

As described above, according to the present invention, multicast communications can be efficiently done while reducing the amount of transmit/receive data required for maintaining the receive order of multicast data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
   a detection section which detects a state of multicast packets which are transmitted by at least some of a plurality of terminals connected by a network, when multicast packets are exchanged among the plurality of terminals; and
   a selection section which selects from among the plurality of terminals a terminal for determining a receive order for maintaining an identical order of multicast packets to be received by the plurality of terminals in accordance with a detection result of said detection section.

2. The apparatus according to claim 1, wherein said detection section comprises a count section which counts the number of multicast packets, and said selection section selects a terminal which has multicasted a largest number of multicast packets.

3. A multicast communication method of performing a multicast communication using packets among a plurality of terminals connected by a network, comprising the steps of:
   issuing a receive order request to a terminal which determines a receive order number for maintaining an identical order of multicast data to be received by at least some of the plurality of terminals, upon transmitting multicast data;
   determining based on a size of the multicast data whether or not a packet to be transmitted is to contain the multicast data;
   multicasting, to the plurality of terminals, a packet formed by appending to the multicast data a receive order number informed in response to a request, when issuance of the receive order number is requested using a packet which does not contain multicast data; and
   writing a receive order number issued for the multicast data in the packet when the terminal for determining the receive order number receives the packet which requests to issue the receive order number, and the received packet contains the multicast data, and multicasting the packet to the plurality of terminals.

4. The method according to claim 3, which includes ignoring a receive order number of specific multicast data, which has been informed in advance, upon receiving multicast data, and receiving other multicast data in an order of receive order numbers.

5. The method according to claim 3, which includes the step of selecting one of a first order number issue procedure for issuing an order number together with multicast data, and a second order number issue procedure for issuing an order number without multicast data on the basis of a size of the multicast data.

6. A communication apparatus comprising:
   a request section which requests a terminal for determining a receive order number for maintaining an identical order of multicast data to be received by at least some of a plurality of terminals to issue the receive order number, when multicast data are exchanged using packets among the plurality of terminals connected by a network;
   a discrimination section which discriminates based on a size of the multicast data whether or not the multicast data is attended to a packet output when the receive order number is requested by said request section; and
   a multicast section which multicasts a packet formed by appending the receive order number informed in response to the request to the multicast data, to the plurality of terminals when said request section requests to issue the receive order number using a packet which does not contain multicast data.

7. The apparatus according to claim 6, wherein said discrimination section selects one of a first order number issue procedure for issuing an order number together with multicast data, and a second order number issue procedure for issuing an order number without multicast data is selected, on the basis of the size of the multicast data.

8. The apparatus according to claim 6, which includes an ignore section which ignores a receive order number of specific multicast data, which has been informed in advance, and a receive section which receives other multicast data in an order of receive order numbers, upon receiving multicast data.

9. A communication apparatus for exchanging multicast data using packets among a plurality of terminals connected by a network, comprising:
   an issue section which issues a receive order number upon receiving a packet, which is transmitted from one of the plurality of terminals that requests to issue the receive order number for maintaining an identical order of multicast data to be received by the plurality of terminals;

a multicast section which writes the receive order number issued by said issue section in the packet and multicasts the packet to the plurality of terminals, when the received packet contains multicast data; and an informing section which informs a terminal, which requests the receive order number, of the receive order number issued by said issue section, when the received packet does not contain multicast data.

10. The apparatus according to claim 9, which includes an ignore section which ignores a receive order number of specific multicast data, which has been informed in advance, and a receive section which receives other multicast data in an order of receive order numbers, upon receiving multicast data.

* * * * *